(12) United States Patent
Ka et al.

(10) Patent No.: US 12,437,442 B2
(45) Date of Patent: Oct. 7, 2025

(54) COOKING APPARATUS AND METHOD FOR CONTROLLING COOKING APPARATUS

(71) Applicant: SAMSUNG ELECTRONICS CO., LTD., Yeongtong-gu (KR)

(72) Inventors: Keehwan Ka, Suwon-si (KR); Seongjoo Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 361 days.

(21) Appl. No.: 18/205,713

(22) Filed: Jun. 5, 2023

(65) Prior Publication Data
US 2024/0070908 A1 Feb. 29, 2024

Related U.S. Application Data

(63) Continuation of application No. PCT/KR2023/006665, filed on May 17, 2023.

(30) Foreign Application Priority Data

Aug. 24, 2022 (KR) .................. 10-2022-0106447
Jan. 17, 2023 (KR) .................. 10-2023-0006906

(51) Int. Cl.
*G06T 7/11* (2017.01)
*F24C 3/12* (2006.01)
(Continued)

(52) U.S. Cl.
CPC .............. *G06T 7/74* (2017.01); *F24C 3/128* (2013.01); *F24C 7/085* (2013.01); *G06T 7/11* (2017.01);
(Continued)

(58) Field of Classification Search
CPC ..... G06T 7/74; G06T 7/50; G06T 7/11; G06T 2207/30128; G06T 2207/30204;
(Continued)

(56) References Cited

U.S. PATENT DOCUMENTS 10,228,145 B2 * 3/2019 Erbe .................. F24C 7/085
10,419,647 B2 9/2019 Park et al.
(Continued)

FOREIGN PATENT DOCUMENTS

CN 104508383 A 4/2015
CN 114601347 A 6/2022
(Continued)

OTHER PUBLICATIONS

International Search Report, PCT/ISA/210, dated Sep. 1, 2023, in PCT Application No. PCT/KR2023/006665.
(Continued)

*Primary Examiner* — Avinash A Savani
(74) *Attorney, Agent, or Firm* — STAAS & HALSEY LLP

(57) ABSTRACT

A cooking apparatus including a chamber; a door configured to open or close the chamber; a plurality of supporters inside the chamber at different heights from each other, each supporter being configured to support a tray; a plurality of markers at different locations on the door; a camera configured to obtain an image of an interior of the chamber; and a controller configured to identify the location of a marker, at least a portion of which is hidden by the tray, of the plurality of markers, in an image of the interior of the chamber obtained by the camera while the tray is being supported inside the chamber by at least one supporter of the plurality of supporters, estimate a height of the tray in the chamber based on the identified location, and determine a cooking parameter to cook an object to be cooked in the chamber based on the estimated height.

20 Claims, 19 Drawing Sheets

(51) Int. Cl.
*F24C 7/08* (2006.01)
*G06T 7/50* (2017.01)
*G06T 7/73* (2017.01)
*H05B 1/02* (2006.01)
*H05B 6/64* (2006.01)

(52) U.S. Cl.
CPC ............. *G06T 7/50* (2017.01); *H05B 1/0263* (2013.01); *H05B 6/6447* (2013.01); *G06T 2207/30128* (2013.01); *G06T 2207/30204* (2013.01)

(58) Field of Classification Search
CPC ........ F24C 3/128; F24C 7/085; H05B 1/0263; H05B 6/6447
USPC ...................................................... 126/273 R
See application file for complete search history.

(56) References Cited

U.S. PATENT DOCUMENTS

| | | | |
|---|---|---|---|
| 10,760,794 | B2 | 9/2020 | Cheng |
| 10,845,060 | B2 | 11/2020 | Bhogal et al. |
| 11,022,322 | B2* | 6/2021 | Clayton ................. F24C 15/04 |
| 11,132,574 | B2 | 9/2021 | Kang |
| 11,187,417 | B2 | 11/2021 | Bhogal et al. |
| 11,221,145 | B2 | 1/2022 | Bhogal et al. |
| 11,622,648 | B2 | 4/2023 | Riefenstein |
| 2009/0070065 | A1* | 3/2009 | Seko ..................... G01B 11/002 702/152 |
| 2016/0327281 | A1* | 11/2016 | Bhogal .................... F24C 7/087 |
| 2017/0115008 | A1* | 4/2017 | Erbe ....................... F24C 7/081 |
| 2018/0324908 | A1 | 11/2018 | Denker et al. |
| 2022/0104654 | A1* | 4/2022 | Wild ....................... H04N 7/188 |
| 2023/0359153 | A1* | 11/2023 | Bentley ................ H05B 1/0263 |

FOREIGN PATENT DOCUMENTS

| | | |
|---|---|---|
| JP | 2019-192355 | 10/2019 |
| KR | 95-33281 | 12/1995 |
| KR | 10-0195466 | 6/1999 |
| KR | 10-2009-0095205 | 9/2009 |
| KR | 10-2018-0083144 | 7/2018 |
| KR | 10-2362654 | 2/2022 |
| KR | 10-2022-0059726 | 5/2022 |
| KR | 10-2022-0098482 | 7/2022 |
| KR | 10-2022-0112419 | 8/2022 |
| WO | WO 2019/059211 A1 | 3/2019 |

OTHER PUBLICATIONS

Written Opinion, PCT/ISA/237, dated Sep. 1, 2023, in PCT Application No. PCT/KR2023/006665.

* cited by examiner

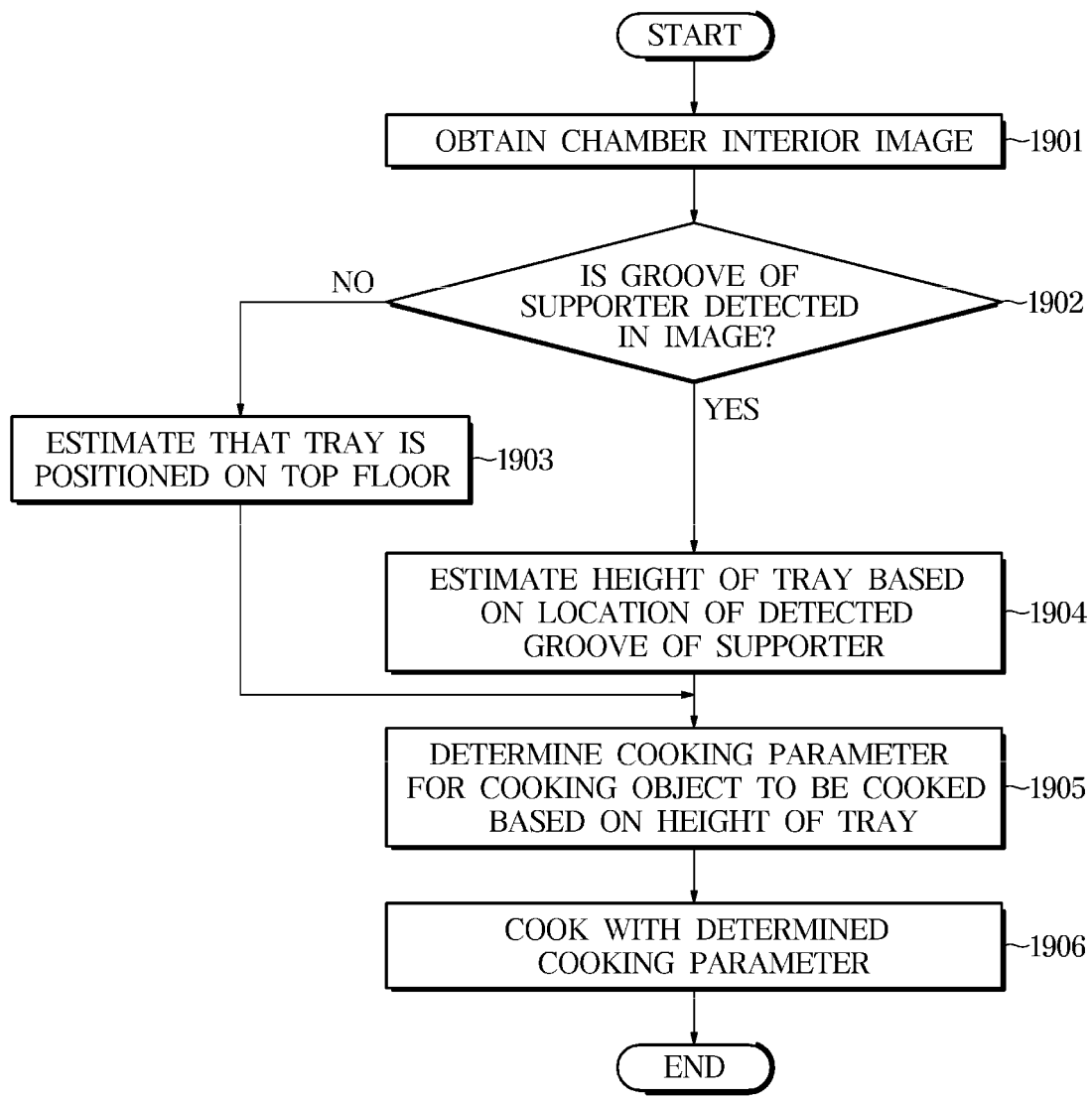

COOKING APPARATUS AND METHOD FOR CONTROLLING COOKING APPARATUS

CROSS-REFERENCE TO RELATED APPLICATIONS

This application is a continuation of International Application No. PCT/KR2023/006665, filed on May 17, 2023, which claims priority to Korean Patent Application Nos. 10-2022-0106447, filed Aug. 24, 2022, and 10-2023-0006906, filed Jan. 17, 2023, the disclosures each of which are incorporated herein by reference in their entireties.

BACKGROUND

1. Field

The disclosure relates to a cooking apparatus and method for controlling the cooking apparatus.

2. Description of Related Art

Cooking apparatuses are devices for cooking an object to be cooked by heating, which provide various functions related to cooking, such as heating, thawing, drying, and sterilizing of the object. The cooking apparatuses include, for example, ovens such as gas ovens or electric ovens, microwave heating devices (also referred to as microwaves), gas ranges, electric ranges, gas grills or electric grills.

In general, the oven cooks food by transferring heat directly to the food or heating the interior of the cooking chamber with a heater that produces heat. The microwave cooks food by frictional heat between molecules, which is produced by using high-frequency waves as a heating source to disturb molecular layouts of the food.

There is a traditional technology to estimate height of a wire rack or height of a food in the chamber by recognizing gaps between wires that form the wire rack from an image of the interior of the chamber. In the traditional technology, however, the position of the food may not be estimated in the chamber when the wire rack is not used.

SUMMARY

According to an embodiment, a cooking apparatus may include a chamber; a door configured to open or close the chamber; a plurality of supporters inside the chamber at different heights from each other, each supporter of the plurality of supporters configured to support a tray inside the chamber; a plurality of markers at different locations on the door; a camera configured to obtain an image of an interior of the chamber; and a controller configured to identify the location of a marker, at least a portion of which is hidden by the tray, of the plurality of markers, in an image of the interior of the chamber obtained by the camera while the tray is being supported inside the chamber by at least one supporter of the plurality of supporters, estimate height of the tray in the chamber based on the identified location, and determine a cooking parameter for cooking an object to be cooked in the chamber based on the estimated height.

According to an embodiment, to identify the location of the marker, at least a portion of which is hidden by the tray, the controller may be configured to extract a segment image which contains a side of the tray adjacent to the door from the image obtained by the camera while the tray is being supported inside the chamber by the at least one supporter of the plurality of supporters, and identify the location of the marker, at least a portion of which is hidden, based on depth information of the extracted segment image.

According to an embodiment, to identify the location of the marker, at least a portion of which is hidden by the tray, the controller is configured to detect a side of the tray adjacent to the door in the image obtained by the camera while the tray is being supported inside the chamber by the at least one supporter of the plurality of supporters, detect another marker of the plurality of markers located closest to the detected side of the tray in the image obtained by the camera while the tray is being supported inside the chamber by the at least one supporter of the plurality of supporters, and identify the location of the marker, at least a portion of which is hidden, based on feature information of the detected another marker.

According to an embodiment, to detect the side of the tray and to detect the another marker, the controller is configured to divide a door area in the image obtained by the camera while the tray is being supported inside the chamber by the at least one supporter of the plurality of supporters into a plurality of segment images, and extract a first segment image containing the side of the tray and a second segment image containing the another marker by sequentially analyzing the plurality of segment images, and the controller may be configured to obtain the feature information of the another marker from the second segment image.

According to an embodiment, to extract the first segment image and the second segment image, the controller is configured to match the plurality of segment images to a plurality of floors in the chamber distinguished by the plurality of supporters, and extract the first segment image and the second segment image by sequentially analyzing the plurality of segment images matched to the plurality of floors from a top floor to a bottom floor.

According to an embodiment, the cooking apparatus may further include a memory configured to store history information relating to height of the tray, wherein the controller may be configured to detect a segment image of the plurality of segment images corresponding to height of the tray recorded lastly or height of the tray recorded the most in the history information, and analyze the detected segment image for a first time.

According to an embodiment, the cooking apparatus may further include a display, wherein the controller is configured to control the display to display height information indicating the estimated height of the tray.

According to an embodiment, the controller may be configured to estimate a nature of the object to be cooked in the chamber and positioned on the tray from the image obtained by the camera while the tray is being supported inside the chamber by the at least one supporter of the plurality of supporters, and determine a cooking parameter based on the estimated nature and the estimated height.

According to an embodiment, the door may include a first transparent glass plate forming an outer surface of the door, and a second transparent glass plate forming an inner surface of the door, and the plurality of markers are on a surface of the first transparent glass plate or on a surface of the second transparent glass plate.

According to an embodiment, the plurality of supporters include a first supporter at first height from a bottom of the chamber, and a second supporter at second height higher than the first height. The plurality of markers may include a lower marker at a first location on the door, a middle marker at a second location on the door corresponding to the first height of the first supporter, and an upper marker at a third location on the door corresponding to the second height of the second supporter, wherein the lower marker is closer to a bottom of the chamber than the middle marker and the upper marker.

According to an embodiment, wherein each marker of the plurality of markers has feature information including at least one of a shape, color, a letter and a symbol.

According to an embodiment, the plurality of supporters may include a first supporter at first height from a bottom of the chamber, and a second supporter at second height higher than the first height from the bottom of the chamber. The first supporter may include a first protrusion protruding from a first side wall of the chamber, a second protrusion separated from the first protrusion and protruding from a second side wall, opposite to the first side wall, of the chamber, and a first groove positioned between the first protrusion and the second protrusion. The second supporter may include a third protrusion protruding from the first side wall of the chamber, a fourth protrusion separated from the third protrusion and protruding from the second side wall of the chamber, and a second groove positioned between the third protrusion and the fourth protrusion. The he first groove and the second groove may longitudinally extend in a horizontal direction at different vertical heights.

According to an embodiment, the controller may be configured to estimate the height of the tray further based on whether at least one of the first groove and the second groove is detected from the image obtained by the camera while the tray is being supported inside the chamber by the at least one supporter of the plurality of supporters. According to an embodiment, a method of controlling a cooking apparatus including a chamber, a door configured to open or close the chamber, a plurality of supporters inside the chamber at different heights from each other with each supporter of the plurality of supporters configured to support a tray inside the chamber, a plurality of markers formed at different locations on the door, and a camera, may include obtaining, by the camera, an image of an interior of the chamber while the tray is being supported inside the chamber by at least one supporter of the plurality of supporters; identifying a location of a marker, at least a portion of which is hidden by the tray, of the plurality of markers, in the obtained image; estimating height of the tray in the chamber based on the identified location; and determining a cooking parameter for cooking an object to be cooked in the chamber based on the estimated height.

According to an embodiment, the identifying of the location of the marker, at least a portion of which is hidden, may include extracting, from the image, a segment image which contains a side of the tray adjacent to the door; and identifying the location of a marker, at least a portion of which is hidden, based on depth information of the extracted segment image.

According to an embodiment, the identifying of the location of the marker, at least a portion of which is hidden, may include detecting a side of the tray adjacent to the door in the image; detecting another marker of the plurality of markers located closest to the detected side of the tray in the image; and identifying the location of the marker, at least a portion of which is hidden, based on feature information of the another marker.

According to an embodiment, the detecting the side of the tray and the detecting the another marker may include dividing a door area in the image into a plurality of segment images; extracting a first segment image containing the side of the tray and a second segment image containing the another marker by sequentially analyzing the plurality of segment images; and obtaining the feature information of the another marker from the second segment image.

According to an embodiment, the extracting the first segment image and the second segment image may include matching the plurality of segment images to a plurality of floors in the chamber distinguished by the plurality of supporters, and extracting the first segment image and the second segment image by sequentially analyzing the plurality of segment images matched to the plurality of floors from a top floor to a bottom floor.

According to an embodiment, the method may include obtaining history information relating to height of the tray stored in a memory; detecting a segment image of the plurality of segment images corresponding to height of the tray recorded lastly or height of the tray recorded the most in the history information; and analyzing the detected segment image for a first time.

According to an embodiment, the method may include estimating a nature of the object to be cooked in the chamber placed on the tray from the image, wherein the cooking parameter is determined based on the estimated nature and the estimated height.

BRIEF DESCRIPTION OF THE DRAWINGS

FIG. 19 is a flowchart describing a method of controlling a cooking apparatus, according to another embodiment.

DETAILED DESCRIPTION

Figure 1:
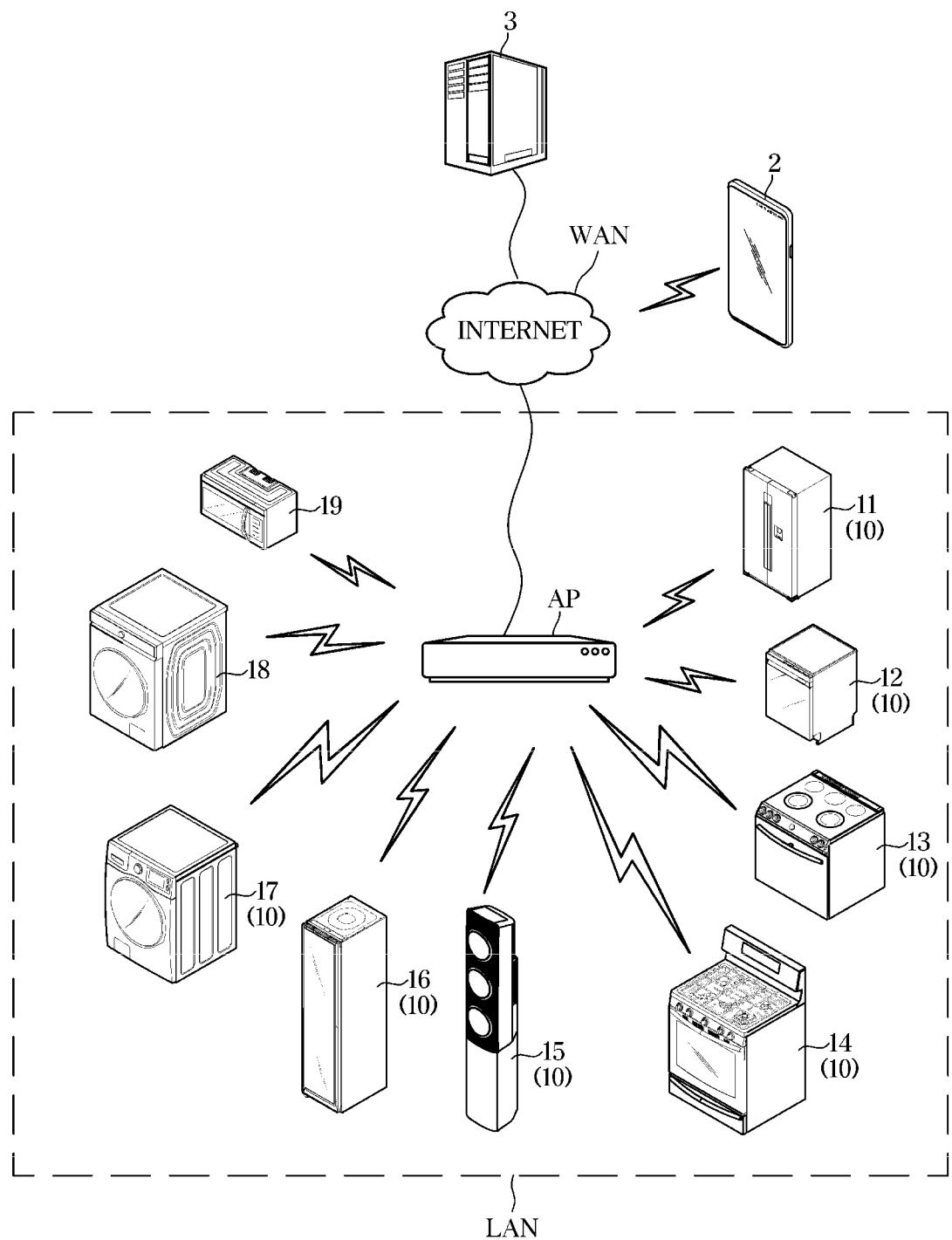
FIG. 1 illustrates a network system implemented by various electronic devices.

It is understood that various embodiments of the disclosure and associated terms are not intended to limit technical features herein to particular embodiments, but encompass various changes, equivalents, or substitutions.

Like reference numerals may be used for like or related elements throughout the drawings.

The singular form of a noun corresponding to an item may include one or more items unless the context states otherwise.

Throughout the specification, "A or B", "at least one of A and B", "at least one of A or B", "A, B or C", "at least one of A, B and C", and "A, B, or C" may each include any one or all the possible combinations of A, B and C.

Terms like "first", "second", etc., may be simply used to distinguish an element from another, without limiting the elements in a certain sense (e.g., in terms of importance or order).

When an element is mentioned as being "coupled" or "connected" to another element with or without an adverb "functionally" or "operatively", it means that the element may be connected to the other element directly (e.g., wiredly), wirelessly, or through a third element.

It will be further understood that the terms "comprise" and/or "comprising," when used in this specification, specify the presence of stated features, integers, steps, operations, elements, parts or combinations thereof, but do not preclude the possible presence or addition of one or more other features, integers, steps, operations, elements, components, and/or groups thereof.

When an element is mentioned as being "connected to" "coupled to", "supported on" or "contacting" another element, it includes not only a case that the elements are directly connected to, coupled to, supported on or contact each other but also a case that the elements are connected to, coupled to, supported on or contact each other through a third element.

Throughout the specification, when an element is mentioned as being located "on" another element, it implies not only that the element is abut on the other element but also that a third element exists between the two elements.

The expression "and/or" is interpreted to include a combination or any of associated elements.

The disclosure provides a cooking apparatus and method for controlling the cooking apparatus, by which the height of a tray or a rack positioned in a chamber may be accurately and easily estimated.

According to the disclosure, a cooking apparatus and method for controlling the cooking apparatus may accurately and easily estimate height of a tray or rack positioned in a chamber by using at least one of a plurality of markers formed on the door or grooves formed in a plurality of supporters.

Furthermore, the cooking apparatus and method for controlling the cooking apparatus may determine a cooking parameter for cooking an object to be cooked based on the height of the tray or rack positioned in the chamber. Accordingly, cooking performance may be improved.

Technological objectives and advantages of the disclosure are not limited to what are mentioned above, and throughout the specification, it will be clearly appreciated by those of ordinary skill in the art that there may be other technological objectives and advantages unmentioned.

The principle and embodiments of the disclosure will now be described with reference to accompanying drawings.

FIG. 1 illustrates a network system implemented by various electronic devices.

Referring to FIG. 1, a home appliance 10 may include a communication module for communicating with another home appliance, a user equipment 2 or a server 3, a user interface for receiving user inputs or outputting information for the user, at least one processor for controlling operations of the home appliance 10, and at least one memory for storing a program for controlling the operations of the home appliance 10.

The home appliance 10 may be at least one of various kinds of home appliances. For example, the home appliance 10 may include at least one of a refrigerator 11, a dish washer 12, an electric range 13, an electric oven 14, an air conditioner 15, a garment care system 16, a washing machine 17, a dryer 18, or a microwave oven 19 as shown, but is not limited thereto. For example, the home appliance 10 may include various types of home appliances such as a cleaning robot, a vacuum cleaner, a television, etc., not shown in the drawing. The aforementioned home appliances are merely an example, and in addition to the aforementioned home appliances, any device connected to another home appliance, the user equipment 2 or the server 3 and able to perform operations as will be described later may belong to the home appliance 10 according to an embodiment.

The server 3 may include a communication module for communicating with another server, the home appliance 10 or the user equipment 2, at least one processor for processing data received from the other server, the home appliance 10 or the user equipment 2, and at least one memory for storing a program for processing data or storing the processed data. The server 3 may be implemented with various computing devices such as a workstation, a cloud, a data drive, a data station, etc. The server 3 may be implemented with one or more servers physically or logically classified based on function, sub-configuration of the function or data, and may transmit or receive data through inter-server communication and process the data.

The server 3 may perform functions, such as managing a user account, registering the home appliance 10 by connecting the home appliance 10 to the user account, and managing or controlling the registered home appliance 10. For example, the user may access the server 3 through the user equipment 2 and create a user account. The user account may be identified by an identity (ID) and a password set by the user. The server 3 may register the home appliance 10 with the user account according to a set procedure. For example, the server 3 may connect identification information (e.g., a serial number, a media access control (MAC) address, etc.) of the home appliance 10 to the user account to register, manage and control the home appliance 10. The user equipment 2 may include a communication module for communicating with the home appliance 10 or the server 3, a user interface for receiving user inputs or outputting information for the user, at least one processor for controlling operations of the use equipment 2, and at least one memory for storing a program for controlling the operations of the user equipment 2.

The user equipment 2 may be carried by the user or placed at the user's home or office. The user equipment 2 may include a personal computer, a terminal, a portable telephone, a smart phone, a handheld device, a wearable device, etc., without being limited thereto.

In the memory of the user equipment 2, a program for controlling the home appliance 10, i.e., an application, may be stored. The application may be sold in a state of being installed in the user equipment 2, or may be downloaded and installed from an external server.

The user may access the server 3 and create a user account by running the application installed in the user equipment 2, and sign up the home appliance 10 by communicating with the server 3 based on the login user account.

For example, when the home appliance 10 is operated to access the server 3 according to a procedure guided in the application installed in the user equipment 2, the server 3 may sign up the home appliance 10 with the user account by registering the identification information (e.g., a serial number or a MAC address) of the home appliance 10 with the user account.

The user may use the application installed in the user equipment 2 to control the home appliance 10. For example, when the user logs in on the user account with the application installed in the user equipment 2, the home appliance 10 registered with the user account may appear, and when a control command is input for the home appliance 10, the control command may be forwarded to the home appliance 10 through the server 3.

A network may include both a wired network and a wireless network. The wired network may include a cable network or a telephone network, and the wireless network may include any network that transmits or receives signals in radio waves. The wired network and the wireless network may be connected to each other.

The network may include a wide area network (WAN) such as the Internet, a local area network (LAN) formed around an access point (AP) and/or a short-range wireless network without an AP. The short-range wireless network may include, for example, Bluetooth (IEEE 802.15.1), Zigbee (IEEE 802.15.4), wireless fidelity (Wi-Fi) direct, near field communication (NFC), Z-wave, etc., without being limited thereto.

The AP may connect the home appliance 10 or the user equipment 2 to the WAN connected to the server 3. The home appliance 10 or the user equipment 2 may be connected to the server 3 through the WAN.

The AP may use wireless communication such as Wi-Fi (IEEE 802.11), Bluetooth (IEEE 802.15.1), Zigbee (IEEE 802.15.4), etc., to communicate with the home appliance 10 or the user equipment 2, and use wired communication to access the WAN, but is not limited thereto.

In various embodiments, the home appliance 10 may be directly connected to the user equipment 2 or the server 3 without passing through the AP.

The home appliance 10 may be connected to the user equipment 2 or the server 3 over a long-range wireless network or a short-range wireless network.

For example, the home appliance 10 may be connected to the user equipment 2 over a short wireless network (e.g., Wi-Fi direct).

In another example, the home appliance 10 may use the long-range wireless network (e.g., a cellular communication module) to be connected to the user equipment 2 or the server 3 through the WAN.

In another example, the home appliance 10 may connect to the WAN by using wired communication, and connect to the user equipment 2 or the server 3 through the WAN.

When the home appliance 10 is able to access the WAN through the wired communication, the home appliance 10 may operate as an AP. Accordingly, the home appliance 10 may connect another home appliance to the WAN to which the server 3 is connected. Furthermore, the other home appliance may connect the home appliance 10 to the WAN to which the server 3 is connected.

The home appliance 10 may transmit information about the operation or status to another home appliance, the user equipment 2 or the server 3 over the network. For example, on receiving a request from the server 3 or when a particular event occurs in the home appliance 10, the home appliance 10 may transmit the information about the operation or the status to the other home appliance, the user equipment 2 or the server 3 periodically or in real time. On receiving the information about the operation or status from the home appliance 10, the server 3 may update information about the operation or status that has been stored, and transmit the updated information about the operation and status of the home appliance 10 to the user equipment 2 over the network. The updating of the information may include various operations to change the existing information such as adding new information to the existing information, replacing the existing information with the new information, etc.

The home appliance 10 may obtain various information from another home appliance, the user equipment 2 or the server 3, and provide the obtained information to the user. For example, the home appliance 10 may obtain information about a function of the home appliance 10 (e.g., cooking instructions, washing instructions, etc.) or various environmental information (e.g., weather, temperature, humidity, etc.), and output the obtained information through the user interface.

The home appliance 10 may operate according to a control command received from another home appliance, the user equipment 2 or the server 3. For example, when the home appliance 10 has won prior approval of the user to operate according to a control command of the server 3 even without a user input, the home appliance 10 may operate according to the control command received from the server 3. The control command received from the server 3 may include a control command input by the user through the user equipment 2, a control command based on a preset condition or the like, without being limited thereto.

The user equipment 2 may transmit information about the user to the home appliance 10 or the server 3 through the communication module. For example, the user equipment 2 may transmit information about a location of the user, a physical condition of the user, a preference of the user, a schedule of the user, etc., to the server 3. The user equipment 2 may transmit the information about the user to the server 3 according to prior approval of the user.

The home appliance 10, the user equipment 2 or the server 3 may determine a control command by using a technology such as artificial intelligence (AI). For example, the server 3 may receive information about the operation or status of the home appliance 10 or information about the user of the user equipment 2, process the information by using a technology such as AI, and transmit a result of the processing or a control command to the home appliance 10 or the user equipment 2 based on the result of the processing.

A cooking apparatus 1 as will be described below corresponds to the aforementioned home appliance 10.

Figure 2:
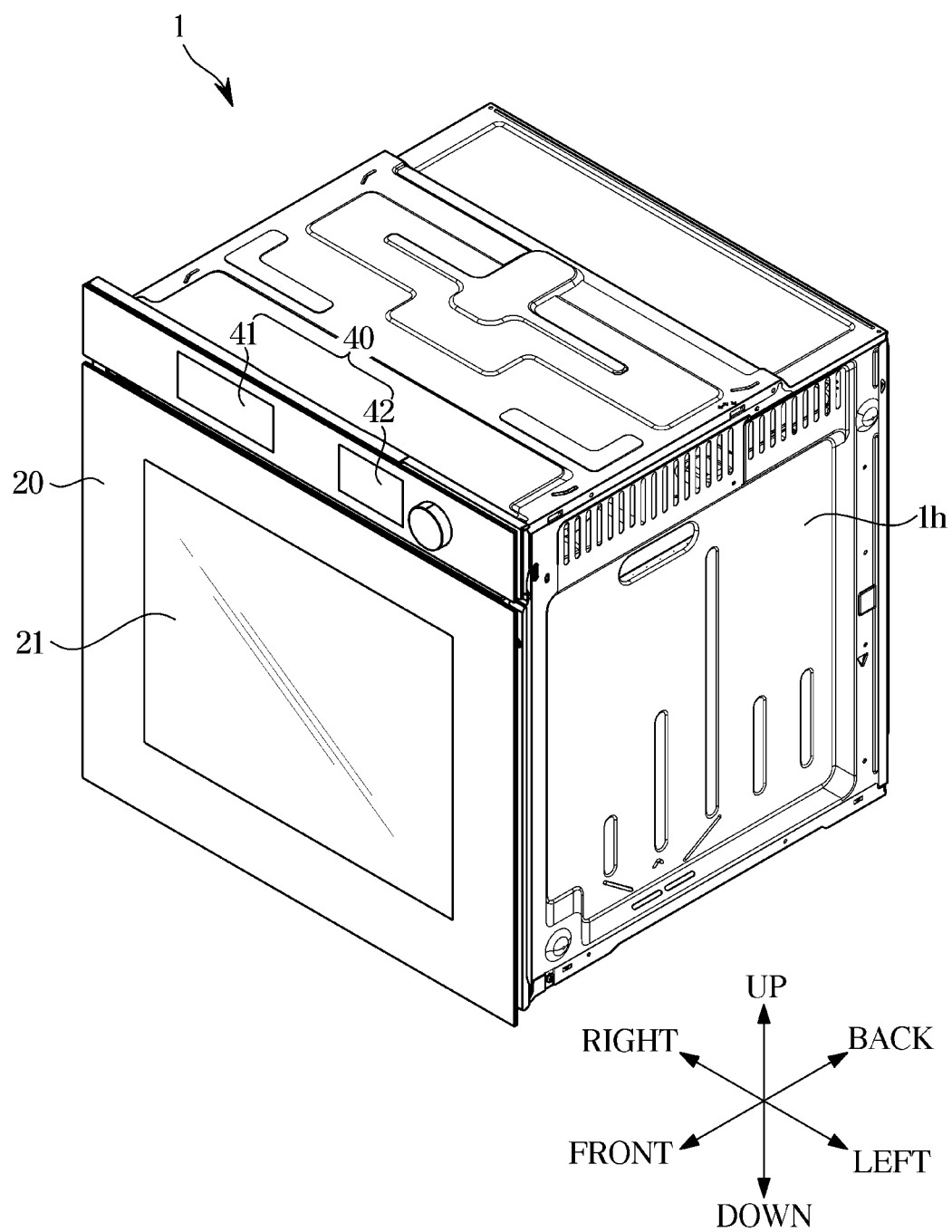
FIG. 2 is a perspective view of a cooking apparatus, according to an embodiment.
Figure 3:
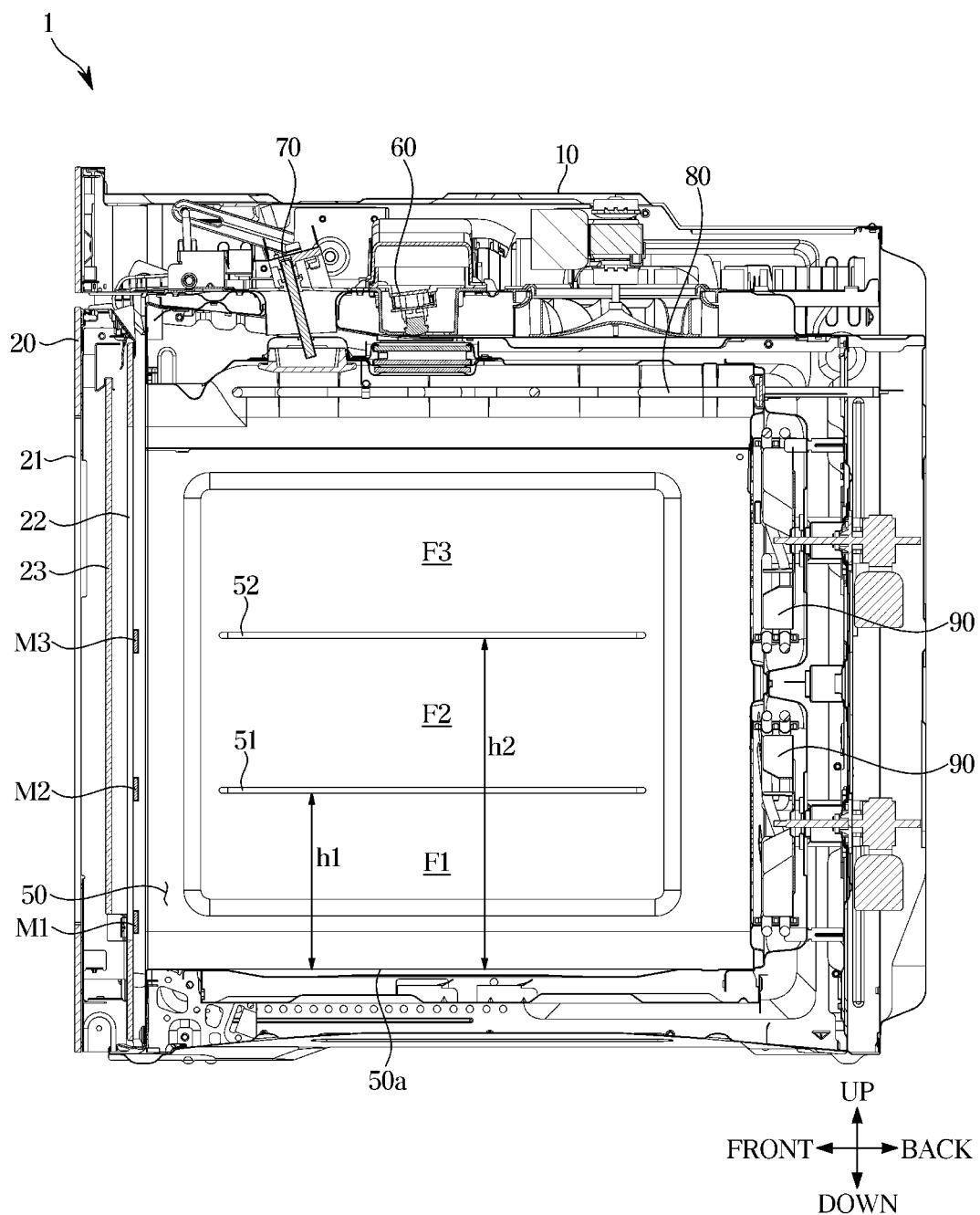
FIG. 3 is a cross-sectional view of a cooking apparatus, according to an embodiment.

FIG. 2 is a perspective view of a cooking apparatus, according to an embodiment. FIG. 3 is a cross-sectional view of a cooking apparatus, according to an embodiment.

Referring to FIGS. 2 and 3, the cooking apparatus 1 may include a housing 1*h* that forms an exterior and a door 20 equipped to open or close an opening of the housing 1*h*. The door 20 may include at least one transparent glass plate 21, 22, or 23. For example, the door 20 may include a first transparent glass plate 21 forming an outer surface of the door 20, and a second transparent glass plate 22 forming an inner surface of the door 20. Furthermore, a third transparent glass plate 23 may be arranged between the first transparent glass plate 21 and the second transparent glass plate 22. Although the door 20 is illustrated as including triple-pane transparent glass plates, it is not limited thereto. The door 20 may include double-pane transparent glass plates or quadruple-pane transparent glass plates as well.

At least one transparent glass plate 21, 22 and 23 included in the door 20 may serve as a window. The user may look into the chamber 50 through the transparent glass plate 21, 22 or 23 while the door 20 is closed. The transparent glass plate 21, 22 or 23 may be formed with a heat-resistant glass.

Furthermore, a plurality of markers M1, M2 and M3 may be formed on the door 20. The plurality of markers M1, M2 and M3 may be formed on the first transparent glass plate 21, the second transparent glass plate 22 or the third transparent glass plate 23 of the door 20. In FIG. 3, illustrated are the plurality of markers M1, M2 and M3 formed on the first transparent glass plate 21.

For example, the plurality of markers M1, M2 and M3 may include a lower marker M1 formed in a first location on the door 20 close to a bottom 50a of the chamber 50, a middle marker M2 formed in a second location on the door 20 corresponding to first height h1 of a first supporter 51, and an upper marker M3 formed in a third location on the door 20 corresponding to second height h2 of a second supporter 52. The lower marker M1, the middle marker M2 and the upper marker M3 may also be referred to as first, second and third markers, respectively. Although three markers are illustrated as being formed on the door 20, it is not limited thereto. The number of the markers formed on the door 20 may vary depending on the number of supporters provided on the side wall of the chamber 50.

A user interface 40 may be provided on the housing 1h of the cooking apparatus 1 to display information relating to operations of the cooking apparatus 1 and obtain a user input. The user interface 40 may include a display 41 for displaying the information relating to operations of the cooking apparatus 1 and an input module 42 for obtaining an input from the user. The display 41 and the input module 42 may be arranged in various positions on the housing 1h. For example, the display 41 and the input module 42 may be located on an upper front surface of the housing 1h.

The display 41 may be provided as various types of display panels. For example, the display 41 may include a liquid crystal display (LCD) panel, a light emitting diode (LED) panel, an organic LED (OLED) panel, or a micro-LED panel. The display 41 may include a touch screen to be used as an input device as well.

The display 41 may display information input by the user or information to be provided for the user in various screens. The display 41 may display information regarding an operation of the cooking apparatus 1 in at least one of an image or text. Furthermore, the display 41 may display a graphic user interface (GUI) that enables the cooking apparatus 1 to be controlled. Hence, the display 41 may display a user interface element (UI element) such as an icon.

The input module 42 may transmit an electrical signal (voltage or current) corresponding to the user input to a controller 200. The input module 42 may include various buttons and/or a dial. For example, the input module 42 may include at least one of a power button to power on or off the cooking apparatus 1, a start/stop button to start or stop a cooking operation, a cooking course button to select a cooking course, a temperature button to set a cooking temperature, and a time button to set a cooking time. Such various buttons may be provided as mechanical buttons or touch buttons.

The dial included in the input module 42 may be rotationally provided. One of a plurality of cooking courses may be selected by turning the dial. The UI elements displayed on the display 41 may be sequentially shifted by turning the dial. The cooking apparatus 1 may perform cooking according to the selected cooking course. The cooking course may include cooking parameters such as a cooking temperature, a cooking time, output power of a heater 80 and output power of a fan 90. Different cooking courses may be selected depending on the location of a tray T in the chamber 50, types, amounts and/or sizes of the object to be cooked.

The cooking apparatus 1 may include the chamber 50 arranged in the housing 1h and containing an object to be cooked. An opening may be provided on the front of the housing 1h. The user may put the object to be cooked into the chamber 50 through the opening of the housing 1h. The chamber 50 may be provided in the form of a rectangular parallepiped.

The plurality of supporters 51 and 52 may be arranged on both side walls of the chamber 50 to place the tray T. The supporters may also be referred to as rails. For example, the plurality of supporters 51 and 52 may be formed to protrude from left and right inner walls of the chamber 50. In another example, the plurality of supporters 51 and 52 may be separate structures to be attached to the left and right inner walls of the chamber 50.

Each of the plurality of supporters 51 and 52 has a preset length in the front-back direction. The plurality of supporters 51 and 52 may be arranged at a distance away from each other in the vertical direction. For example, the plurality of supporters 51 and 52 may include the first supporter 51 and the second supporter 52 formed at a higher position than that of the first supporter 51. The first supporter 51 may be located at first height h1 from the bottom 50a of the chamber 50. The second supporter 52 may be located at second height h2 from the bottom 50a of the chamber 50, which is higher than the first height h1. Furthermore, as will be described later, the plurality of supporters 51 and 52 may each include a protrusion and a groove. The groove of the supporter 51 or 52 may be used to estimate the height of the tray T in the chamber 50.

The first supporter 51 may refer to a pair of supporters located on the left and right inner walls of the chamber 50 at the first height. The second supporter 52 may refer to a pair of supporters located on the left and right inner walls of the chamber 50 at the second height. The space in the chamber 50 may be divided by the plurality of supporters 51 and 52 into a plurality of floors. For example, the bottom 50a of the chamber 50 may form the first floor F1, the first supporter 51 may form the second floor F2, and the second supporter 52 may form the third floor F3.

The tray T may be situated on the plurality of supporters 51 and 52 in the chamber 50 at various heights. For example, the tray T may be put on the floor 50a of the chamber 50, the first supporter 51 or the second supporter 52. When the tray T is put into the chamber 50, the upper surface of the tray T may face the ceiling of the chamber 50. An object to be cooked may be located on the upper surface of the tray T. The tray T may have various shapes. For example, the tray T be formed in a rectangular parallepiped.

When a plurality of trays is situated at the same time, a plurality of cooking spaces may be formed. For example, when the plurality of trays is situated on the floor 50a, the first supporter 51 and the second supporter 52, first, second and third floor spaces may be formed in the chamber 50.

Although two supporters 51 and 52 provided on both side walls of the chamber 50 are illustrated, the disclosure is not limited thereto. Depending on the design, a various number of rails may be provided. The larger the chamber 50, the more rails may be provided.

Various components required for operations of the cooking apparatus 1 may be arranged between the chamber 50 and the housing 1*h*. For example, the cooking apparatus 1 may include a camera 60, a light 70, a fan 90 and various circuits.

The camera 60 may obtain an image of the interior of the chamber 50. The camera 60 may transmit data of the obtained image to the controller 200. To secure a field of view (FOV) of the camera 60, a portion of the upper plane of the chamber 50 adjacent to the location of the camera 60 may be formed with a transparent material (e.g., transparent heat resistant glass).

The light 70 may emit light into the chamber 50. The interior of the chamber 50 may be lighted by the light emitted from the light 70. Accordingly, brightness, contrast and/or definition of the image obtained by the camera 60 may increase, and discrimination of an object contained in the image may be improved.

Another portion of the upper plane of the chamber 50 adjacent to the location of the light 70 may be equipped with a diffuser material to transmit and diffuse the light from the light 70 into the chamber 50.

The heater 80 may be placed at an upper end of the chamber 50. The heater 80 may supply heat into the chamber 50. An object to be cooked may be cooked by the heat produced by the heater 80. One or more heaters 80 may be provided. A heating level and a heating time of the heater 80 may be controlled by the controller 200. Output power and the heating time of the heater 80 may be differently controlled according to a location of the tray T in the chamber 50, a type, quantity and/or a size of the object to be cooked. That is, the operation of the heater 80 may be differently controlled depending on the cooking course.

The fan 90 may circulate air in the chamber 50. The fan 90 may include a motor and a blade. One or more fans 90 may be provided. As the fan 90 operates, the air heated by the heater 80 may circulate in the chamber 50. Accordingly, the heat produced by the heater 80 may be evenly delivered from top to bottom in the chamber 50. A rotation speed and rotation time of the fan 90 may be controlled by the controller 200. The operation of the fan 90 may be differently controlled depending on the cooking course. Output power and rotation time of the fan 90 may be differently controlled according to a location of the tray T in the chamber 50, a type, quantity and/or a size of the object to be cooked.

Figure 4:
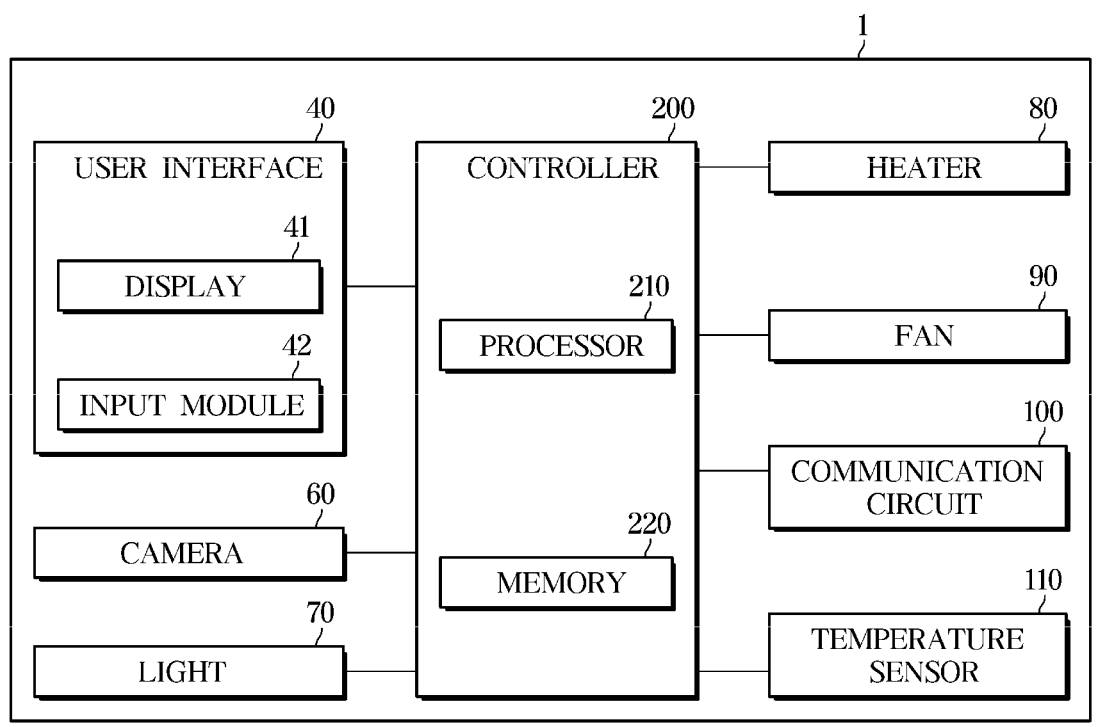
FIG. 4 illustrates control components of a cooking apparatus, according to an embodiment.

FIG. 4 illustrates control components of a cooking apparatus, according to an embodiment.

Referring to FIG. 4, the cooking apparatus 1 may include the user interface 40, the camera 60, the light 70, the heater 80, the fan 90, a communication circuit 100, a temperature sensor 110, a timer 120, and the controller 200. The controller 200 may be electrically connected to the components of the cooking apparatus 1 to control the respective components of the cooking apparatus 1.

The user interface 40 may include a display 41 and an input module 42. The display 41 may display information relating to an operation of the cooking apparatus 1. The display 41 may display information input by the user or information to be provided for the user in various screens.

The input module 42 may obtain a user input. The user input may include various commands. For example, the input module 42 may obtain at least one of a command to select an item, a command to select a cooking course, a command to control the heating level of the heater 80, a command to control the cooking time, a command to control the cooking temperature, a command to start cooking or a command to stop cooking. The user input may be obtained from the user equipment 2.

The controller 200 may process the command received through at least one of the input module 42 or the user equipment 2 to control an operation of the cooking apparatus 1. The cooking apparatus 1 may automatically cook based on cooking, course information obtained from the user equipment 2 or the server 3.

The camera 60 may obtain an image of the interior of the chamber 50. The controller 200 may control the camera 60 to obtain the image of the interior of the chamber 50 when the cooking apparatus 1 is powered on and the door 20 is closed. The controller 200 may control the camera 60 to obtain the image of the interior of the chamber 50 at preset time intervals until cooking is completed after the cooking is started. The controller 200 may use a plurality of images obtained while a cooking operation is performed to determine a cooking state of the object to be cooked.

The controller 200 may identify various objects contained in the image of the interior of the chamber 50 obtained by the camera 60. The controller 200 may identify the object to be cooked contained in the image. The controller 200 may identify the tray T in the image and identify the marker M1, M2 or M3 on the door 20. The controller 200 may use a learning model obtained from the memory 220 or the server 3 to identify the object to be cooked in the image. The controller 200 may process the image to estimate the type, amount and/or size of the object to be cooked.

The controller 200 may analyze the image obtained by the camera 60 to estimate height of the tray T located in the chamber 50. The controller 200 may identify a location of a marker, at least a portion of which is hidden by the tray T in the image. The controller 200 may estimate the height of the tray T in the chamber 50 based on the location of the marker, at least a portion of which is hidden. Furthermore, the controller 200 may estimate the height of the tray T located in the chamber 50 based on whether the groove of the supporter 51 or 52 is detected in the image of the chamber interior. A detailed method of estimating the height of the tray T by using the marker M1, M2 or M3 formed on the door 20 and/or the groove of the supporter 51 or 52 will be described later.

The controller 200 may determine a cooking parameter for cooking the object to be cooked based on the estimated height of the tray T. The height of the tray T located in the chamber 50 plays an important role in determining the cooking quality. For example, the tray T is situated on the second supporter 52 so that the object to be cooked may be located in the space of the third floor F3. In this case, the object to be cooked may be relatively thin, and by and large, a cooking course to burn the surface of the object to be cooked may be required. In another example, the tray T is situated on the bottom 50*a* of the chamber 50 so that the object to be cooked may be located in the space of the first floor F1. In this case, the object to be cooked may be relatively thick, and by and large, a cooking course to evenly cook the object to be cooked to the inside may be required. As such, the cooking parameter may be differently determined according to the height of the tray T in the chamber 50.

The light 70 may emit light into the chamber 50. The controller 200 may control the light 70 to emit light when the cooking apparatus 1 is powered on. The controller 200 may control the light 70 to emit light until the cooking is completed or until the cooking apparatus 1 is powered off.

The heater 80 may supply heat into the chamber 50. The controller 200 may control output power of the heater 80. For example, the controller 200 may control the heating level and the heating time of the heater 80. The heating level and heating time of the heater 80 may be controlled according to a location of the tray T in the chamber 50, a type, quantity and/or a size of the object(s) to be cooked.

The fan 90 may circulate air in the chamber 50. The controller 200 may control the output power of the fan 90. For example, the controller 200 may control the rotation speed and rotation time of the fan 90. The controller 200 may control the rotation speed and rotation time of the fan 90 according to a location of the tray T in the chamber 50, a type, quantity and/or a size of the object(s) to be cooked.

The communication circuit 100 may perform connection to at least one of the user equipment 2 or the server 3 over a network. The controller 200 may obtain various information, various signals and/or various data from the server 3 through the communication circuit 100. For example, the communication circuit 100 may receive a remote control signal from the user equipment 2. The controller 200 may obtain a learning model used to analyze the image from the server 3 through the communication circuit 100.

The communication circuit 100 may include various communication modules. The communication circuit 100 may include a wireless communication module and/or a wired communication module. For a wireless communication technology, a wireless LAN, a home radio frequency (RF), infrared communication, ultra-wide band (UWB) communication, Wi-Fi, Bluetooth, Zigbee, etc., may be applied.

The temperature sensor 110 may detect temperature in the chamber 50. The temperature sensor 110 may be installed in various positions in the chamber 50. The temperature sensor 110 may transmit an electrical signal corresponding to the detected temperature to the controller 200. The controller 200 may control at least one of the heater 80 and the fan 90 to maintain the chamber 50 at a cooking temperature determined according to the type, quantity and/or the cooking course of the object to be cooked.

Apart from this, the cooking apparatus 1 may include various sensors. For example, the cooking apparatus 1 may include a current sensor and a voltage sensor. The current sensor may measure a current applied to the electronic components of the cooking apparatus 1. The voltage sensor may measure a voltage applied to the electronic components of the cooking apparatus 1.

The controller 200 may include the processor 210 and the memory 220. The processor 210 may include logic circuits and operation circuits in hardware. The processor 210 may control the electrically connected components of the cooking apparatus 1 based on a program, instructions and/or data stored in the memory 220 for an operation of the cooking apparatus 1. The controller 200 may be implemented with a control circuit including circuit elements such as a condenser, an inductor and a resistor. The processor 210 and the memory 220 may be implemented in separate chips or in a single chip. Furthermore, the controller 200 may include a plurality of processors and a plurality of memories.

The memory 220 may store the program, application and/or data for the operation of the cooking apparatus 1 and store data created by the processor 210. The memory 220 may include a non-volatile memory such as a read only memory (ROM) and a flash memory for storing the data for a long time. The memory 220 may include a volatile memory for temporarily storing data, such as a static random access memory (SRAM) and a dynamic random access memory (DRAM).

The components of the cooking apparatus 1 are not limited thereto. The cooking apparatus 1 may further include various components in addition to the aforementioned components, and it is also possible that some of the aforementioned components are omitted.

Figure 5:
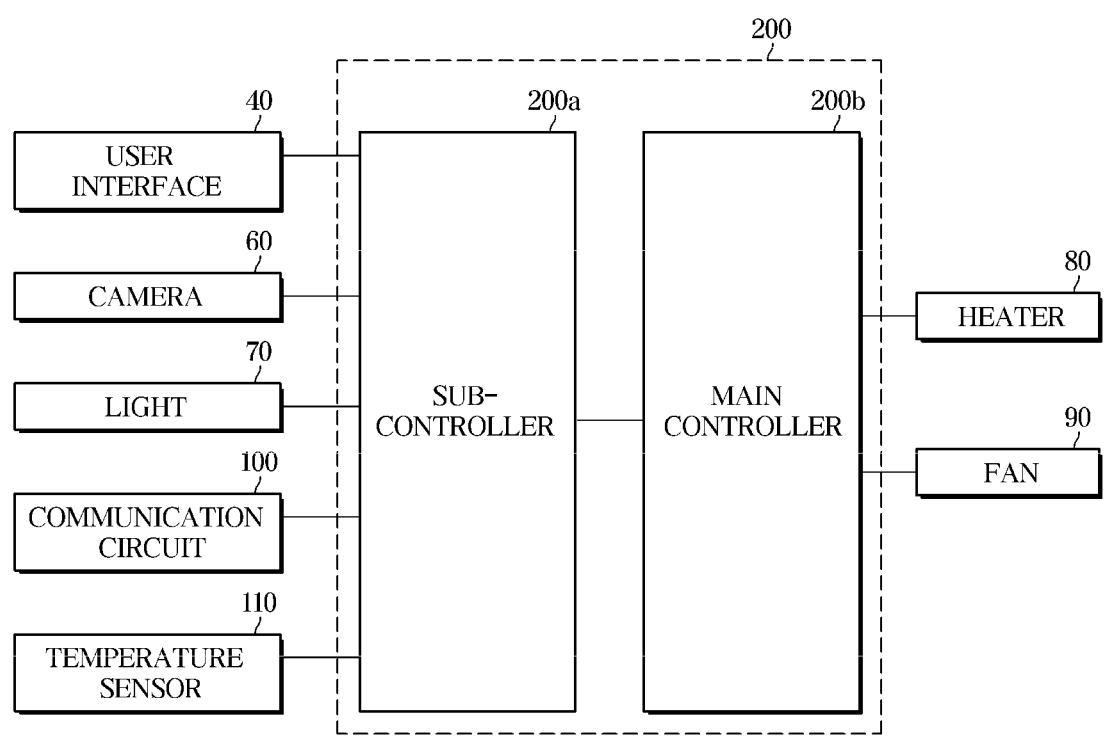
FIG. 5 illustrates a configuration of a controller described in FIG. 4.

FIG. 5 illustrates a configuration of the controller described in FIG. 4.

Referring to FIG. 5, the controller 200 may include a sub-controller 200a and a main controller 200b. The sub-controller 200a and the main controller 200b may be electrically connected to each other, and may each include a separate processor and a separate memory. The main controller 200b may be electrically connected to the heater 80 and the fan 90 to control operations of the heater 80 and the fan 90.

The sub-controller 200a may control operations of the user interface 40, the camera 60, the light 70, the communication circuit 100 and the temperature sensor 110. The sub-controller 200a may process an electrical signal corresponding to an input from the user through the user interface 40, and control the user interface 40 to display information about an operation of the cooking apparatus 1.

Furthermore, the sub-controller 200a may obtain a reference image and a learning model for identifying an object to be cooked and estimating height of the tray T from the server 3. The sub-controller 200a may use the reference image and the learning model to identify an object to be cooked from an image obtained by the camera 60. The sub-controller 200a may pre-process the image, use the learning model to identify an object to be cooked, and estimate the type, quantity and/or the size of the object to be cooked. The sub-controller 200a may use the learning model to estimate height of the tray T in the chamber 50 from the image of the interior of the chamber 50 obtained by the camera 60.

When the image obtained by the camera 60 is input to the learning model, the learning model may output the type, quantity and/or the size of the object to be cooked contained in the image. Furthermore, the learning model may output the height of the tray T in the chamber 50.

The learning, model refers to an AI model. The learning model may be created by machine learning and/or deep learning. The learning model may be created by the server 3 and stored in the memory 220 of the cooking apparatus 1. A learning algorithm may include e.g., supervised learning, unsupervised learning, semi-supervised learning, or reinforcement learning, without being limited thereto.

The learning model may include a plurality of artificial neural network layers. The artificial neural network may be one of a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of two or more of them, without being limited thereto. Additionally or alternatively, the AI model may include a software structure in addition to the hardware structure.

The sub-controller 200a may include a special processor for performing a multi-input-multi-output (MIMO) operation (i.e., a matrix operation) to process the AI algorithm. The special processor included in the sub-controller 200a may be referred to as a neural processing unit (NPU).

Figure 6:
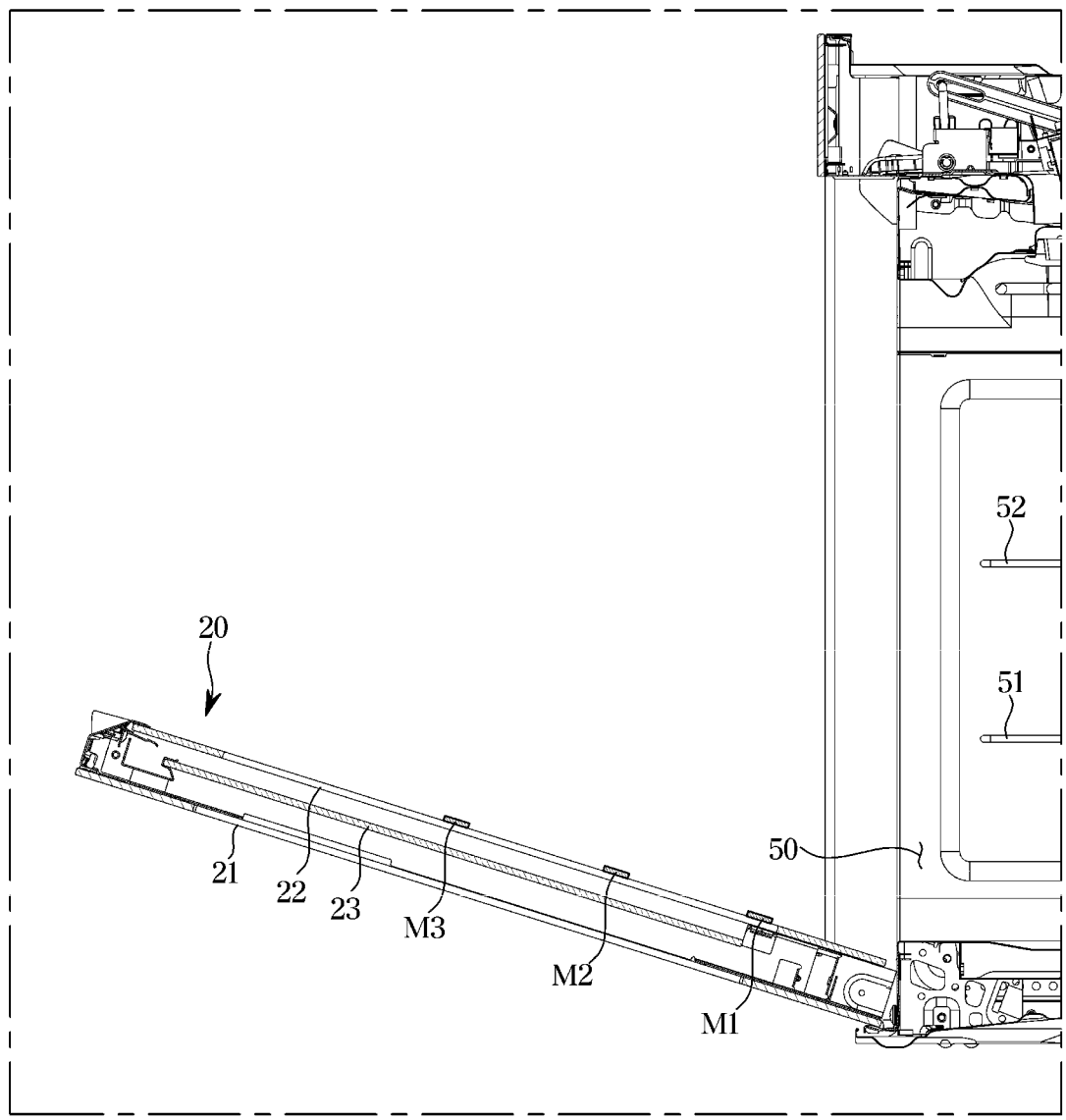
FIG. 6 illustrates an example of locations at which a plurality of markers are formed on a door.
Figure 7:
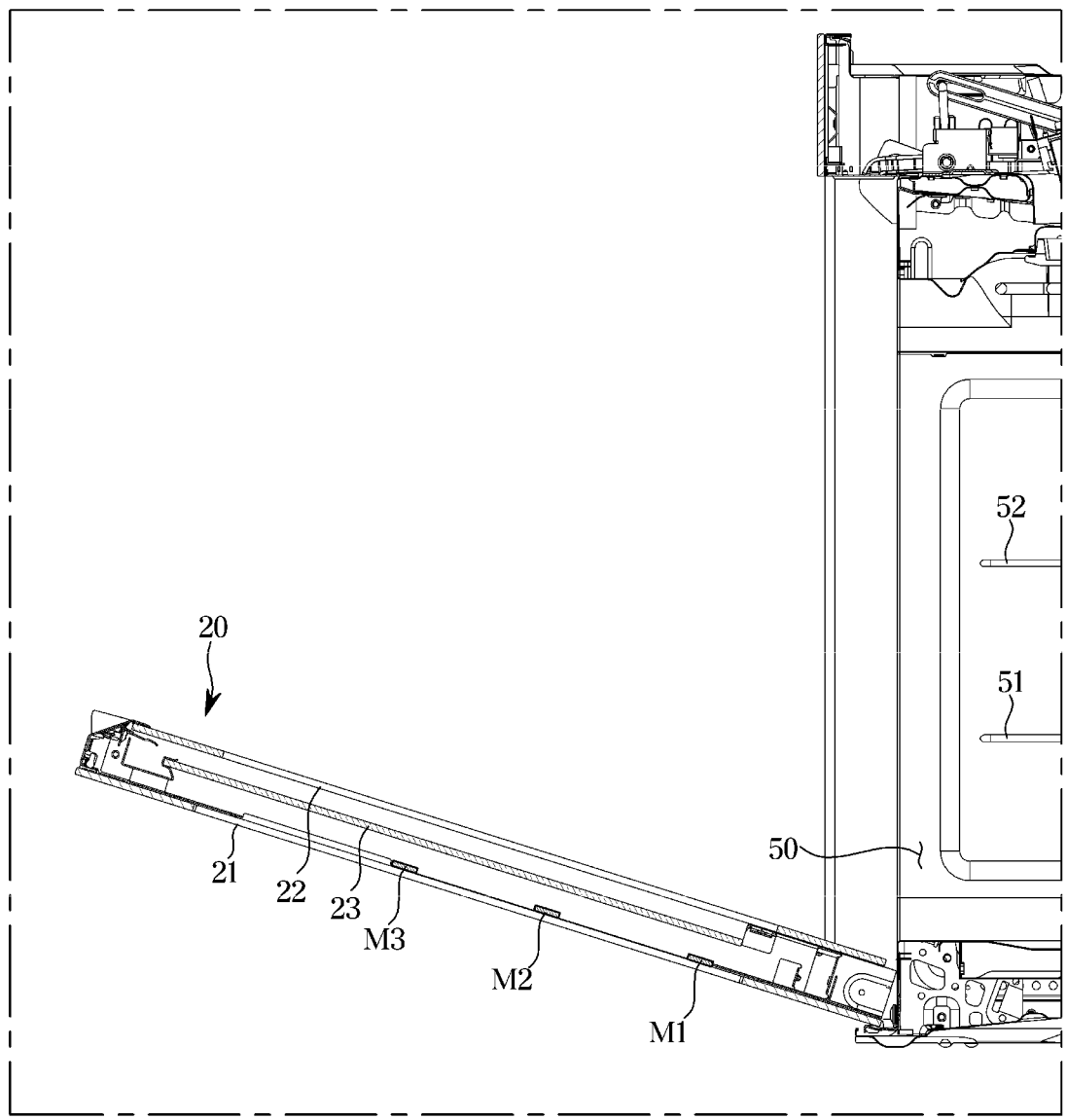
FIG. 7 illustrates another example of locations at which a plurality of markers are formed on a door.
Figure 8:
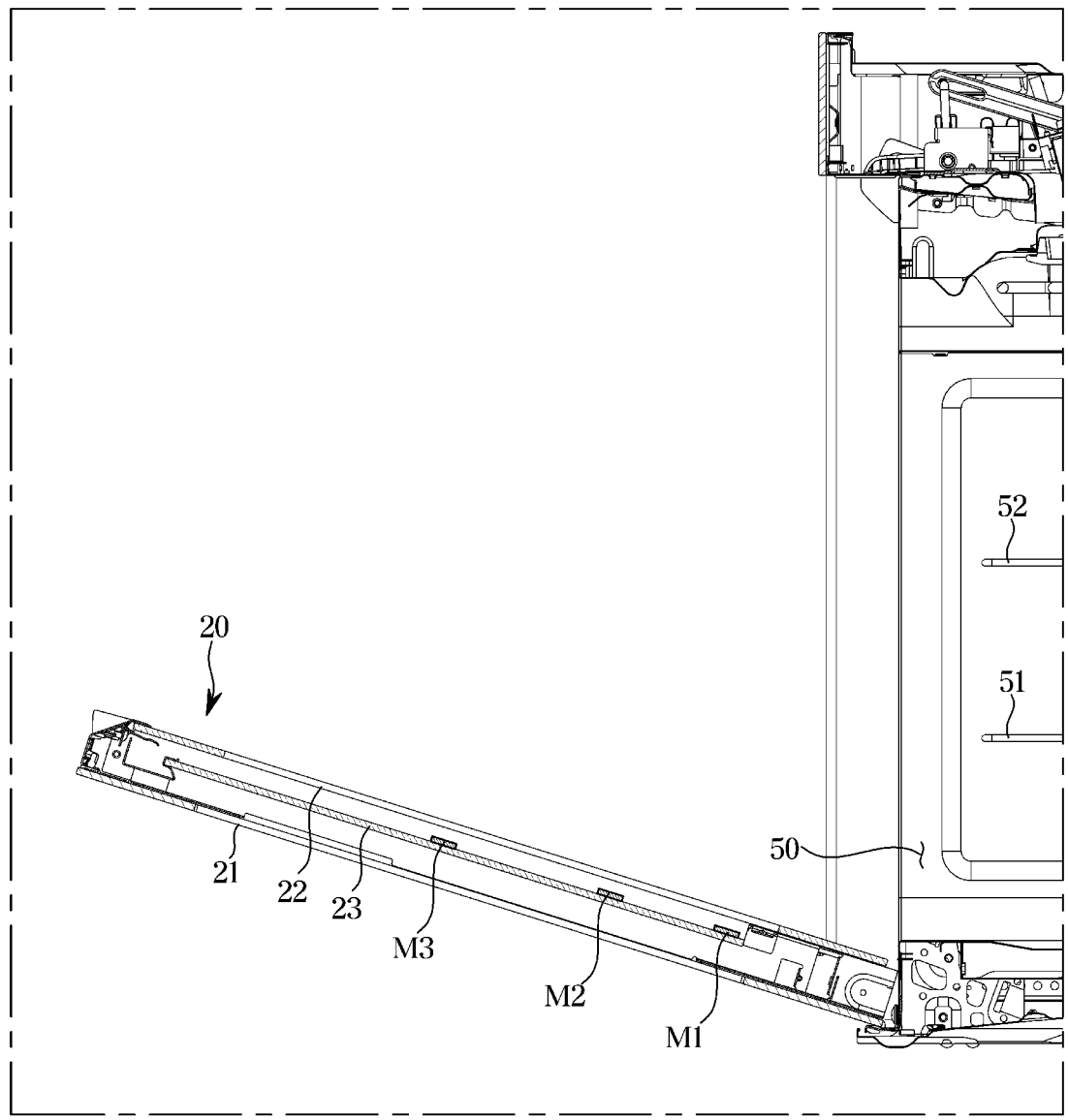
FIG. 8 illustrates another example of locations at which a plurality of markers are formed at a door.

FIG. 6 illustrates an example of locations at which a plurality of markers are formed on a door. FIG. 7 illustrates another example of locations at which a plurality of markers are formed on a door. FIG. 8 illustrates another example of locations at which a plurality of markers are formed on a door.

Referring to FIGS. 6, 7, and 8, the door 20 may include the first transparent glass plate 21 forming the outer surface of the door 20, and the second transparent glass plate 22 forming the inner surface of the door 20. Furthermore, a third transparent glass plate 23 may be arranged between the first transparent glass plate 21 and the second transparent glass plate 22. Although the door 20 is illustrated as including triple-pane transparent glass plates, it is not limited thereto. The door 20 may include double-pane transparent glass plates or quadruple-pane transparent glass plates as well.

The plurality of markers M1, M2 and M3 may be formed on the first transparent glass plate 21, the second transparent glass plate 22 or the third transparent glass plate 23 of the door 20. The plurality of markers M1, M2 and M3 may be formed on the transparent glass plate 21, 22 or 23 by using various methods. For example, the plurality of markers M1, M2 and M3 may be created by glass-printing a heat-resistant material on the transparent glass plate 21, 22 or 23. The plurality of markers M1, M2 and M3 may also be a metal material. In another example, the plurality of markers M1, M2 and M3 may be imprinted on the transparent glass plate 21, 22 or 23.

As the transparent glass plate 21, 22 or 23 of the door 20 transmits light, the plurality of markers M1, M2 and M3 may be captured by the camera 60 even when the plurality of markers M1, M2 and M3 are formed on the first transparent plate 21 that forms the outer surface of the door 20. Similarly, the plurality of markers M1, M2 and M3 formed on the second transparent glass plate 22 or the third transparent glass plate 23 may also be captured by the camera 60.

The plurality of markers M1, M2 and M3 may be separated at preset intervals. For example, the plurality of markers M1, M2 and M3 may include the lower marker M1 formed in the first location on the door 20 close to the bottom 50a of the chamber 50, the middle marker M2 formed in the second location on the door 20 corresponding to the first height h1 of the first supporter 51, and the upper marker M3 formed in the third location on the door 20 corresponding to the second height h2 of the second supporter 52. The lower marker M1, the middle marker M2 and the upper marker M3 may also be referred to as first, second and third markers, respectively.

Although three markers are illustrated as being formed on the door 20, it is not limited thereto. The number of the markers formed on the door 20 may vary depending on the number of supporters 51 and 52 provided on the side wall of the chamber 50.

Each of the plurality of markers M1, M2 and M3 may be formed to have feature information including at least one of a shape, color, a letter and a symbol. Based on the feature information including at least one of the shape, color, letter and symbol, the plurality of markers M1, M2 and M3 may be identified from one another. For example, the lower marker M1, the middle marker M2 and the upper marker M3 may have different shapes, different colors, different letters, or different symbols. The plurality of markers M1, M2 and M3 may be used to estimate height of the tray T located in the chamber 50.

Figure 9:
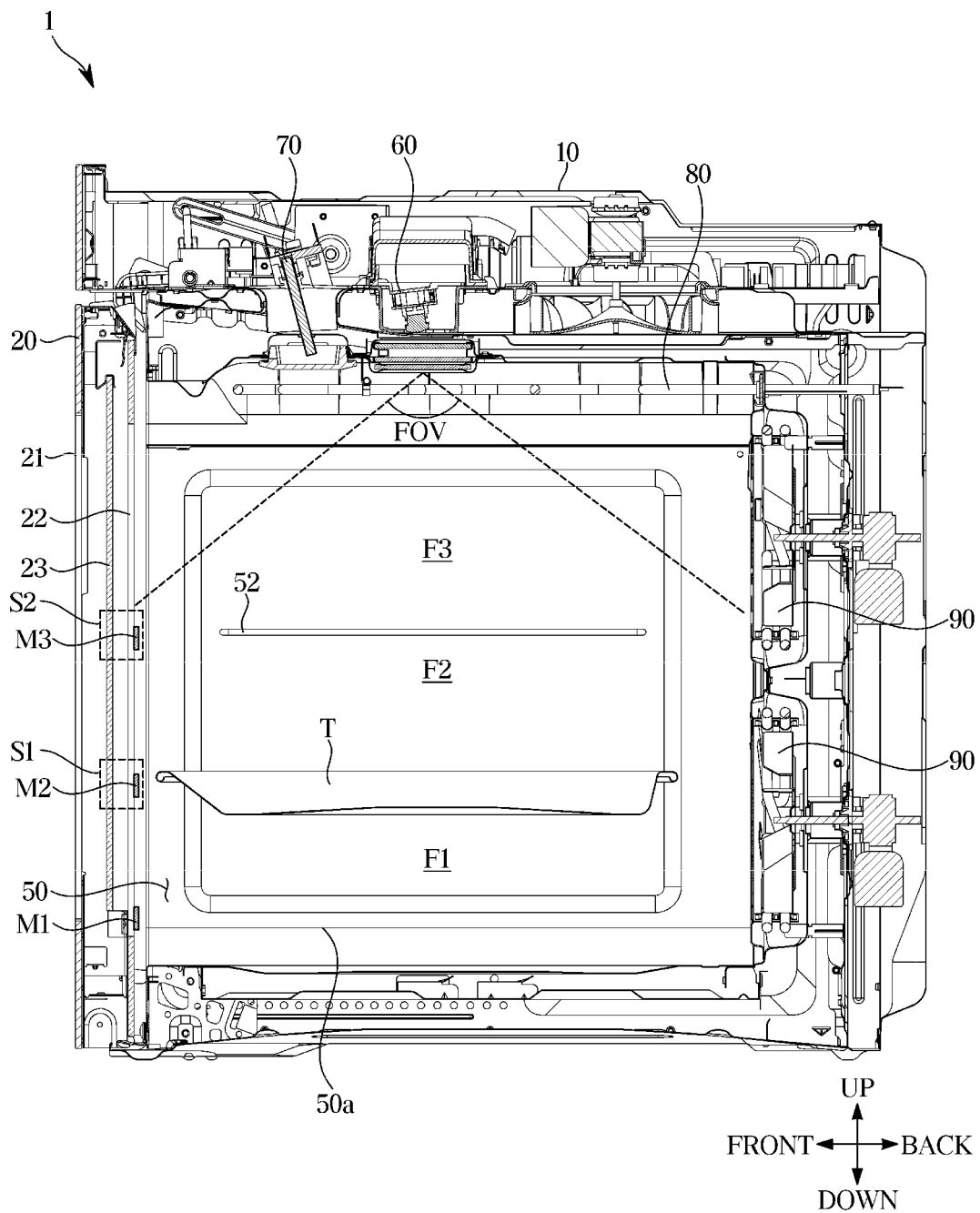
FIG. 9 illustrates an example of a tray situated on a first supporter on a side wall of a chamber.
Figure 10:
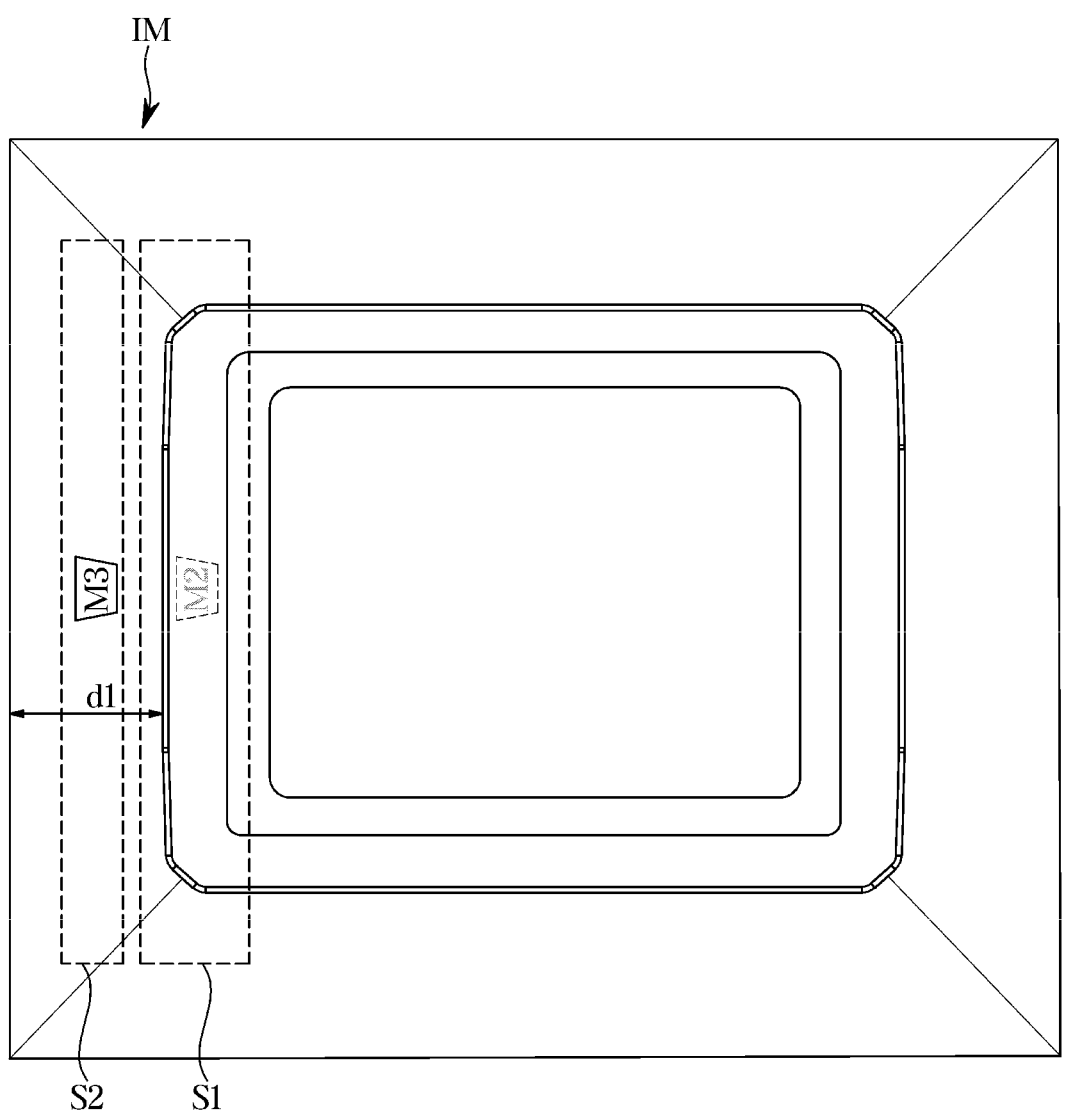
FIG. 10 illustrates an image of the interior of a chamber captured by a camera above the chamber shown in FIG. 9.

FIG. 9 illustrates an example of a tray situated on a first supporter on a side wall of a chamber. FIG. 10 illustrates an image of the interior of a chamber captured by a camera above the chamber shown in FIG. 9.

Referring to FIGS. 9 and 10, the tray T may be situated on the first supporter 51. One side of the tray T situated on the first supporter 51 may be adjacent to the door 20. The one side of the tray T may be adjacent to the middle marker M2 formed at a level corresponding to the first height h1 of the first supporter 51 among the plurality of markers M1, M2 and M3 formed on the door 20.

The camera 60 may have a preset FOV. The camera 60 may be located above the chamber 50, and may have an FOV directed to the inside of the chamber 50 from the upper plane of the chamber 50. An image 1M of the interior of the chamber 50 obtained by the camera 60 may contain an object located in the chamber 50. The object contained in the image IM may vary depending on whether there is the tray T situated and the height of the tray T. For example, the image 1M in FIG. 10 may contain the tray T, a portion of the inner surface of the door 20, a portion of a side wall of the chamber 50, and the upper marker M3. When there is an object to be cooked on the upper surface of the tray T, the object may also be contained in the image IM.

When the tray T is situated in the chamber 50 and the door 20 is closed, one of the plurality of markers M1, M2 and M3 formed on the door 20 may contact or located very close to the one side of the tray T. As the camera 60 captures the interior of the chamber 50 from above the chamber 50, at least a portion of the marker contacting or adjacent to the one side of the tray T may look like being hidden from the FOV of the camera 60. Furthermore, the marker under the tray T may not be captured by the camera 60 either. Specifically, depending on the height at which the tray T is located in the chamber 50, at least one of the plurality of markers M1, M2 and M3 formed on the door 20 may not be detected from the image 1M.

The controller 200 of the cooking apparatus 1 may identify a location of a marker, at least a portion of which is hidden by the tray T, in the image IM. The controller 200 may estimate the height of the tray T in the chamber 50 based on the location of the marker, at least a portion of which is hidden. The controller 200 may determine a cooking parameter for cooking the object to be cooked based on the estimated height of the tray T.

Referring to FIGS. 9 and 10, at least a portion of the middle marker M2 may be hidden by the tray T in the image IM. The lower marker M1 under the middle marker M2 may be fully hidden by the tray T and may not be detected from the image 1M. The controller 200 may identify the location of the middle marker M2, at least a portion of which is hidden. The controller 200 may estimate that the tray T is situated at a height corresponding to the location of the middle marker M2 in the chamber 50.

A method of estimating the height of the tray T by identifying the location of a marker hidden by the tray T may be provided in various ways.

As an example of the method of estimating the height of the tray T, a method of using feature information of a marker detected from the image IM may be provided. The method of using the feature information of a marker may be used when at least one marker is detected from the image IM.

The controller 200 may detect the one side of the tray T adjacent to the door 20 in the image 1M, and detect another marker located closest to the one side of the tray T in the image IM. The controller 200 may identify the location of a marker hidden by the tray T based on feature information of the other marker. For this, the controller 200 may extract a first segment image S1 that contains the one side of the tray T adjacent to the door 20 from the image IM. The controller 200 may extract a second segment image S2 that contains another marker (i.e., the upper marker M3) located closest to the one side of the tray T from the image IM. The controller 200 may obtain feature information of the other marker (i.e., the upper marker M3) from the second segment image S2. The controller 200 may identify from the feature information of the other marker that the other marker is the upper marker M3.

The controller 200 may identify that there is not middle marker M2 but upper marker M3 in the image IM of FIG. 10. The controller 200 may identify that the marker located under the upper marker M3 and hidden by the tray T is the middle marker M2. Hence, the controller 200 may estimate that the tray T is situated at a height corresponding to the location of the middle marker M2 in the chamber 50.

The memory 220 stores height information of the supporters 51 and 52 and location information of the markers M1, M2 and M3 corresponding to the height information of the supporters 51 and 52. As the location of the middle marker M2 hidden by the tray T corresponds to the first height h1 of the first supporter 51, the controller 200 may estimate the height of the tray T in the chamber 50 to be the first height h1 of the first supporter 51.

To extract the first segment image S1 and the second segment image S2 from the image IM, the controller 200 of the cooking apparatus 1 may divide a door area in the image IM into a plurality of segment images. The controller 200 may extract the first segment image S1 containing one side of the tray T and the second segment image S2 containing a marker, at least a portion of which is hidden, and another marker by sequentially analyzing the plurality of segment images.

The sequence of analyzing the plurality of segment images may be determined in various methods. For example, the controller 200 may match each of the plurality of segment images to one of the plurality of floors F1, F2 and F3 in the chamber 50 that are distinguished by the plurality of supporters 51 and 52. The controller 200 may extract the first segment image S1 and the second segment image S2 by sequentially analyzing the plurality of segment images matched to the plurality of floors F1, F2 and F3 from top to bottom floors.

In another example, to set the sequence of analyzing the plurality of segment images, history information relating to height of the tray T stored in the memory 220 may be used. The controller 200 may detect a segment image corresponding to the height of the tray T recorded lastly or the height of the tray T recorded the most in the history information among the plurality of segment images. The controller 200 may analyze the detected segment image for the first time. The time taken to estimate the tray height may be shortened by analyzing a segment image corresponding to a particular floor based on the history information. That is, speed of estimation of the tray height may become faster.

As another example of the method of estimating the height of the tray T, a method of using depth information of an object in the image IM obtained by the camera 60 may be provided. The method of using the depth information of the object may be useful in a case that no marker is detected from the image IM. The case that no marker is detected from the image 1M will be described in connection with FIGS. 11 and 12.

A size of an area occupied by the tray T in the image IM may vary depending on the height of the tray T located in the chamber 50. The higher the height of the tray T in the chamber 50, the larger the area occupied by the tray T in the image IM. On the contrary, the lower the height of the tray T in the chamber 50, the smaller the area occupied by the tray T in the image IM. In other words, the size ratio between image IM and tray T areas varies depending on the height of the tray T. Accordingly, the controller 200 of the cooking apparatus 1 may obtain depth information of the tray T based on the size of the area occupied by the tray T in the image IM.

To obtain the depth information of the tray T, the controller 200 may extract the first segment image S1 that contains one side of the tray T from the image IM. The controller 200 may obtain depth information of the first segment image S1 having first depth d1 of the tray T in the image IM. The controller 200 may detect the length of the one side of the tray T contained in the first segment image S1. The controller 200 may calculate a size of the area occupied by the tray T in the image IM, and estimate the first depth d1 of the tray T corresponding to the length of the one side of the tray T.

The memory 220 may store height information of the supporters 51 and 52 and location information of the markers M1, M2 and M3 corresponding to the height information of the supporters 51 and 52. The controller 200 may identify a marker (i.e., the middle marker M2) and a supporter (i.e., the first supporter 51) matched to the first depth d1 of the tray T based on the height information of the supporters 51 and 52 and the location information of the markers M1, M2 and M3. As the location of the middle marker M2 hidden by the tray T corresponds to the first height h1 of the first supporter 51, the controller 200 may estimate the height of the tray Tin the chamber 50 to be the first height h1 of the first supporter 51.

The cooking apparatus 1 may provide information about the estimated height of the tray T to the user. The controller 200 of the cooking apparatus 1 may control the display 41 to display the height information of the tray T. The controller 200 may determine a cooking parameter based on the height of the tray T. The controller 200 of the cooking apparatus 1 may also estimate a nature of an object to be cooked placed on the tray T in the image M. The nature of the object to be cooked may include a kind, quantity, and/or a size of the object to be cooked. The controller 200 may control the display 41 to display the nature information of the object to be cooked. The controller 200 may determine a cooking parameter by taking both the nature of the object to be cooked and the height of the tray T into account.

Figure 11:
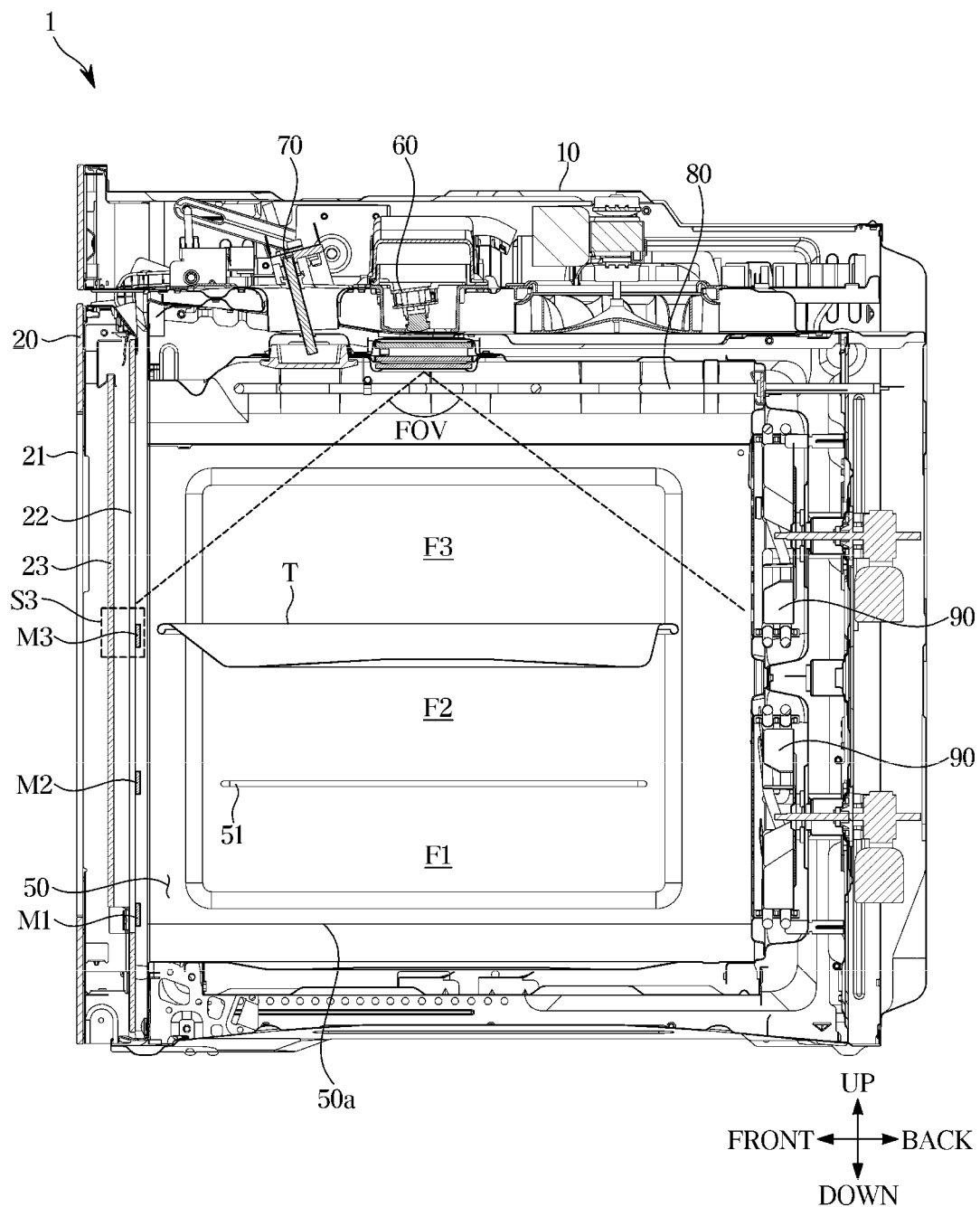
FIG. 11 illustrates an example of a tray situated on a second supporter on a side wall of a chamber.
Figure 12:
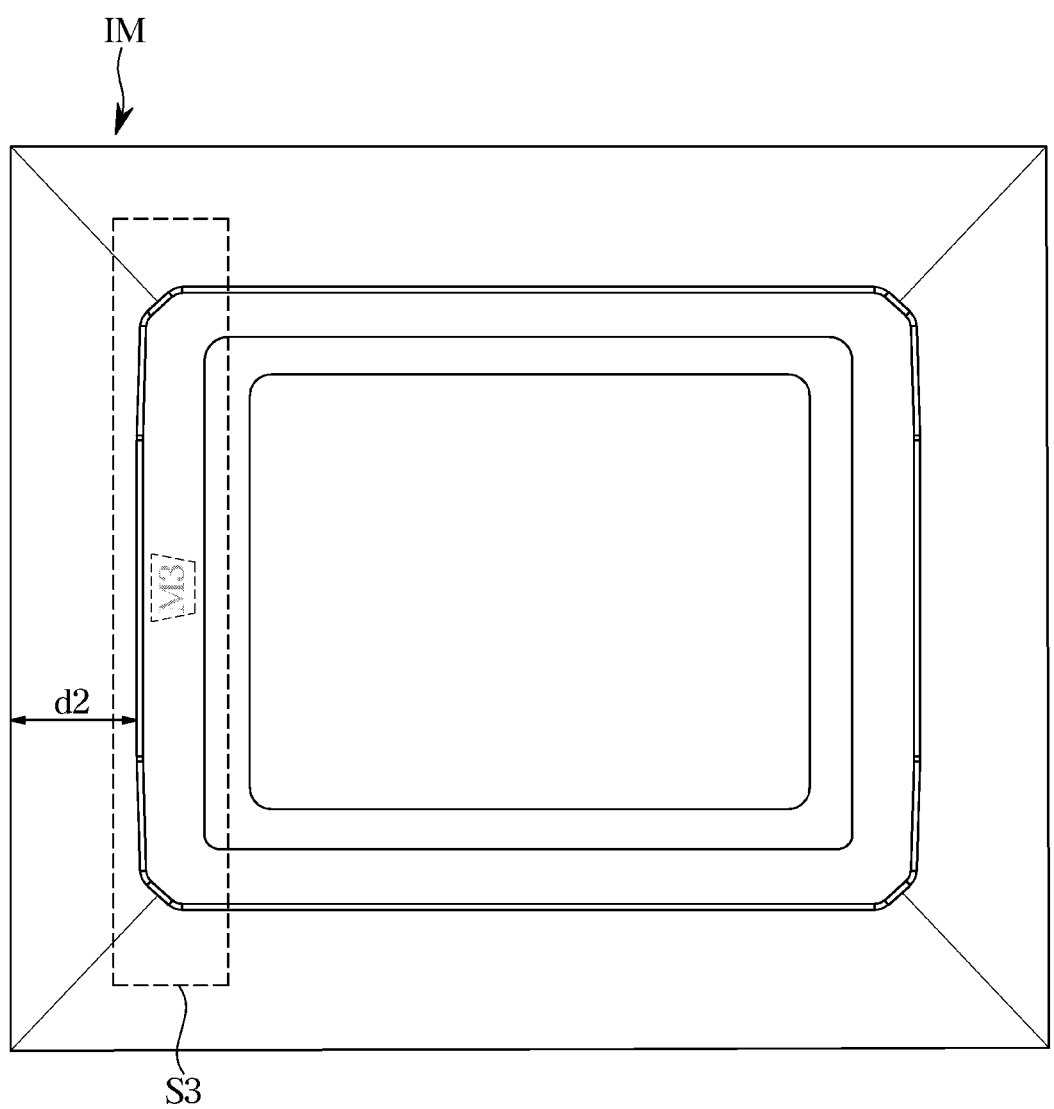
FIG. 12 illustrates an image of the interior of a chamber captured by a camera above the chamber shown in FIG. 11.

FIG. 11 illustrates an example of a tray situated on a second supporter on a side wall of a chamber. FIG. 12 illustrates an image of the interior of a chamber captured by a camera above the chamber shown in FIG. 11.

Referring to FIGS. 11 and 12, the tray T may be situated on the second supporter 52. One side of the tray T situated on the second supporter 52 may be adjacent to the upper marker M3 formed at a level corresponding to the second height h2 of the second supporter 52 among the plurality of markers M1, M2 and M3.

Any marker may not be identified in the image IM obtained by the camera 60 while the tray T is situated on the second supporter 52. The one side of the tray T situated on the second supporter 52 may contact the upper marker M3 or may be located very closely to the upper marker M3. Hence, in the FOV of the camera 60, the upper marker M3 may look like being hidden by the tray T. Furthermore, the middle marker M2 and the lower marker M1 located under the tray T may not be captured by the camera 60 either.

When no marker M1, M2 or M3 is detected from the image IM obtained by the camera 60, the controller 200 of the cooking apparatus 1 may estimate that the tray Tis located on the top floor in the chamber 50. In other words, the tray T may be estimated as being situated on the second supporter 52 and as having the height of the second supporter 52. Furthermore, the controller 200 may obtain depth information of the tray T in the image 1M, and estimate that the tray T is located on the top floor in the chamber 50 based on the depth information of the tray T.

The controller 200 may extract a third segment image S3 that contains one side of the tray T from the image IM. The third segment image S3 is different from the first segment image S1 as described above in FIG. 10. The controller 200 may obtain depth information of the third segment image S3 including second depth d2 of the tray T in the image IM. The controller 200 may detect a length of one side of the tray T contained in the third segment image S3, and estimate the second depth d2 of the tray T corresponding to the length of the one side of the tray T. The second depth d2 of the tray T is less than the first depth d1 of the tray T as described in FIG. 10.

The controller 200 may identify a marker (i.e., the upper marker M3) matched to the second depth d2 of the tray T based on the height information of the supporters 51 and 52 and the location information of the markers M1, M2 and M3 stored in the memory 220. As the location of the upper marker M3 hidden by the tray T corresponds to the second height h2 of the second supporter 52, the controller 200 may estimate the height of the tray T in the chamber 50 to be the second height h2 of the second supporter 52.

Figure 13:
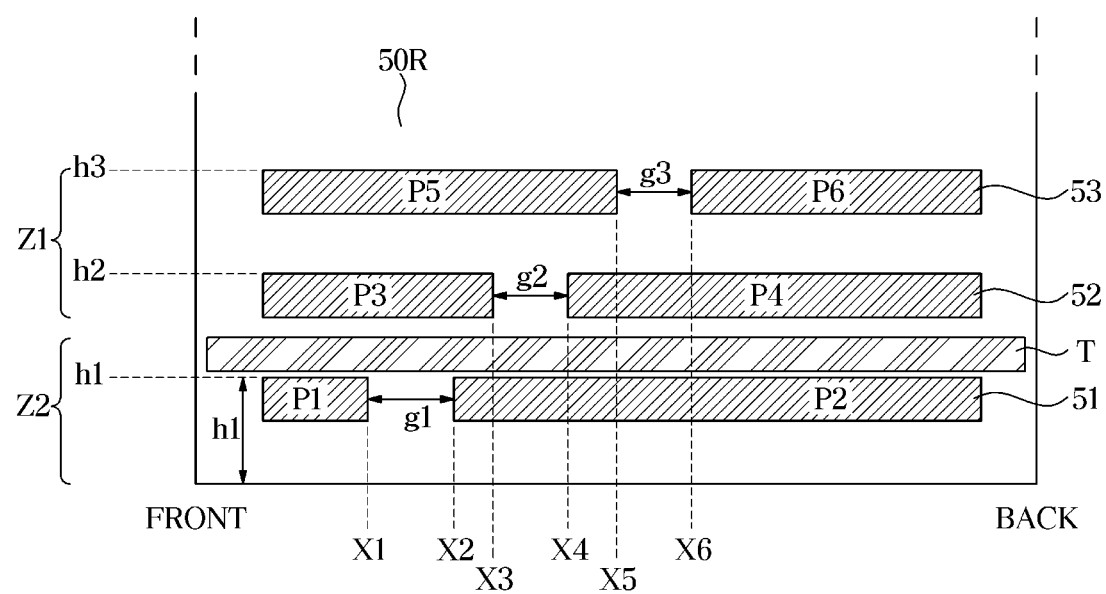
FIG. 13 illustrates an example of a plurality of supporters formed on a side wall of a chamber.
Figure 14:
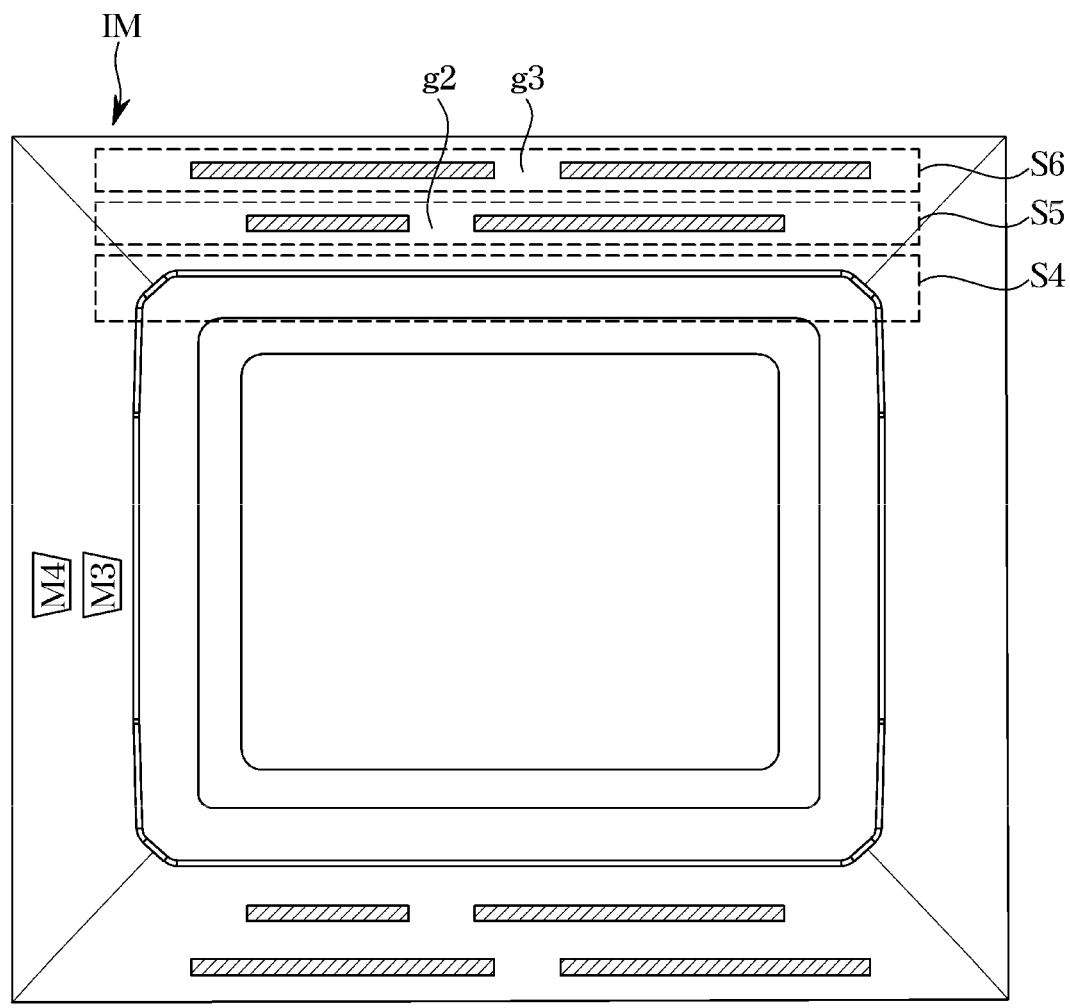
FIG. 14 illustrates an image of the interior of a chamber captured by a camera above the chamber while a tray is situated on one of the plurality of supporters shown in FIG. 13.

FIG. 13 illustrates an example of a plurality of supporters formed on a side wall of a chamber. FIG. 14 illustrates an image of the interior of a chamber captured by a camera above the chamber while a tray is situated on one of the plurality of supporters shown in FIG. 13.

Referring to FIGS. 13 and 14, the first supporter 51, the second supporter 52 and a third supporter 53 may be arranged on a right inner wall 50R of the chamber 50. The supporters may be arranged on the left inner wall of the chamber 50 in the same manner. The first supporter 51 may be located at the first height h1 from the bottom 50a of the chamber 50. The second supporter 52 may be located at the second height h2 higher than the first height h1. The third supporter 53 may be located at third height h3 higher than the second height h2.

The plurality of supporters 51, 52 and 53 may each include protrusions and a groove. The first supporter 51 may include a first protrusion P1 and a second protrusion P2 protruding from both side walls and separated from each other, and a first groove g1 located between the first protrusion P1 and the second protrusion P2. The second supporter 52 may include a third protrusion P3 and a fourth protrusion P4 protruding from both side walls and separated from each other, and a second groove g2 located between the third protrusion P3 and the fourth protrusion P4. The third supporter 53 may include a fifth protrusion P5 and a sixth protrusion P6 protruding from both side walls and separated from each other, and a third groove g3 located between the fifth protrusion P5 and the sixth protrusion P6. The protrusions may have different horizontal lengths. The protrusions may also have different protruding heights from the side wall.

The grooves g1, g2 and g3 of the plurality of supporters 51, 52 and 53 are in different positions. As the plurality of supporters 51, 52 and 53 have different heights, the first groove g1, the second groove g2 and the third groove g3 are positioned on different horizontal lines. Furthermore, the first groove g the second groove g2 and the third groove g3 may be positioned on different vertical lines. When the right inner wall 50R of the chamber 50 is projected onto a two-dimensional (2D) coordinate plane, respective coordinates of the grooves g1, g2 and g3 may appear differently. The first groove g1 may be located between horizontal coordinates X1 and X2, the second groove g2 may be located between horizontal coordinates X3 and X4, and the third groove g3 may be located between horizontal coordinates X5 and X6.

The memory 220 may store coordinate information of each groove in advance. The controller 200 may use the coordinate information of the grooves stored in the memory 220 to identify the location of a groove of a supporter detected from the image of the interior of the chamber 50 captured by the camera 60.

The controller 200 of the cooking apparatus 1 may estimate the height of the tray T based on whether at least one of the first groove g1, the second groove g2 and the third groove g3 is detected from the image of the interior of the chamber 50. For example, when the tray T is situated on the first supporter 51, the interior space of the chamber 50 may be classified into a first zone Z1 that is possible to be captured by the camera 60 and a second zone Z2 that is not possible to be captured by the camera 60. As shown in FIG. 14, the second groove g2 of the second supporter 52 and the third groove g3 of the third supporter 53 may be identified but the first supporter 51 and the first groove g1 may not be identified in the image IM obtained by the camera 60. The controller 200 may use the coordinate information of the grooves stored in the memory 220 to differentiate the second groove g2 and the third groove g3. As the second groove g2 and the third groove g3 are identified, the controller 200 may determine that the tray T is situated on the first supporter 51 and estimate the height of the tray T to be the first height h1 of the first supporter 51.

To estimate the height of the tray T, the controller 200 may extract a fourth segment image S4 that contains the one side of the tray T adjacent to the side wall of the chamber 50 from the image IM. Furthermore, the controller 200 may extract the fifth segment image S5 that contains the second supporter 52 and the sixth segment image S6 that contains the third supporter 53. The fourth segment image S4, the fifth segment image S5 and the sixth segment image S6 may be successively extracted. The controller 200 may identify the second groove g2 from the fifth segment image S5 and identify the third groove g3 from the sixth segment image S6. The controller 200 may identify that the first groove g1 is not present in the image IM. The controller 200 may identify that the first supporter 51 including the first groove g1 is hidden by the tray T. Accordingly, the controller 200 may estimate the height of the tray T to be the first height h1 of the first supporter 51.

The grooves g1, g2 and g3 formed in the plurality of supporters 51, 52 and 53 as described in FIGS. 13 and 14 may play the same role as the plurality of markers M1, M2 and M3 formed on the door 20. In other words, the grooves g1, g2 and g3 formed in the plurality of supporters 51, 52 and 53 may replace the plurality of markers M1, M2 and M3 formed on the door 20.

Furthermore, to estimate the height of the tray T more accurately, the cooking apparatus 1 may include not only the markers M1, M2 and M3 formed on the door 20 but also the grooves g1, g2 and g3 formed in the supporters 51, 52 and 53.

Figure 15:
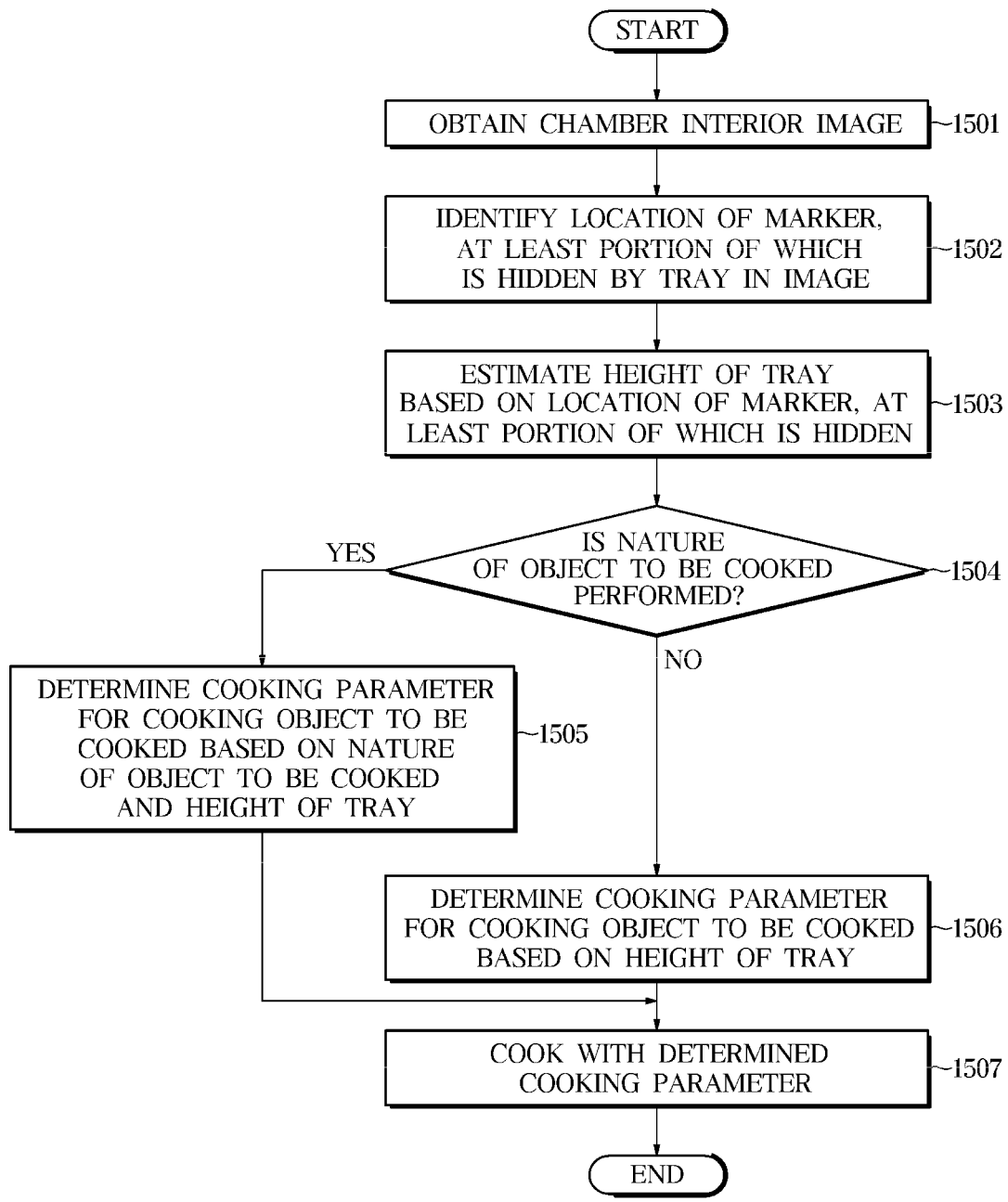
FIG. 15 is a flowchart describing a method of controlling a cooking apparatus, according to an embodiment.

FIG. 15 is a flowchart describing a method of controlling a cooking apparatus, according to an embodiment.

Referring to FIG. 15, the controller 200 of the cooking apparatus 1 may control the camera 60 to obtain an image of the interior of the chamber 50, in 1501. The controller 200 may control the camera 60 to obtain an image of the interior of the chamber 50 when the cooking apparatus 1 is powered on and the door 20 is closed.

The controller 200 may identify a location of a marker, at least a portion of which is hidden by the tray T, in the image obtained by the camera 60, in 1502. The controller 200 may estimate the height of the tray T in the chamber 50 based on the location of the marker, at least a portion of which is hidden, in 1503.

The controller 200 may estimate a nature of an object to be cooked located on the upper surface of the tray T from the image. The nature of the object to be cooked may include a kind, quantity and/or a size of the object to be cooked. Whether to estimate the nature of the object to be cooked may be determined based on a user input. When the estimation of the nature of the object to be cooked is performed, the controller 200 may determine a cooking parameter by taking both the nature of the object to be cooked and the height of the tray T into account, in 1504 and 1505.

When the estimation of the nature of the object to be cooked is skipped, the controller 200 may determine a cooking parameter based on the estimated height of the tray T, in 1504 and 1506. The controller 200 may control the heater 80 and the fan 90 with the determined cooking parameter to perform cooking, in 1507.

Figure 16:
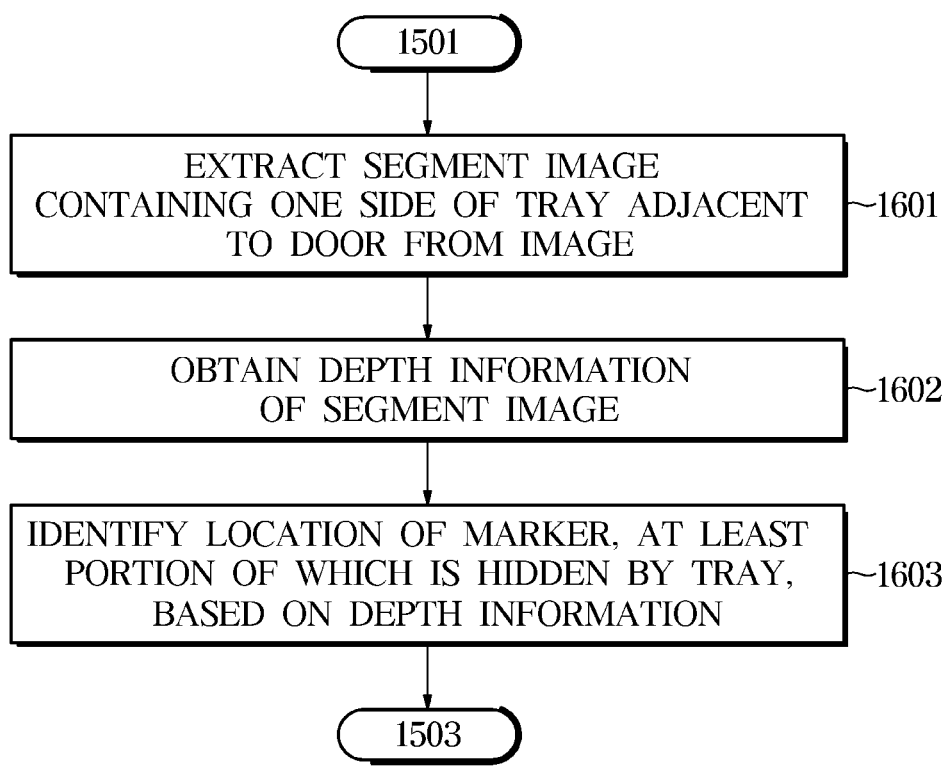
FIGS. 16, 17 and 18 are flowcharts describing various embodiments that further specify the method of controlling the cooking apparatus as described in FIG. 15.
Figure 17:
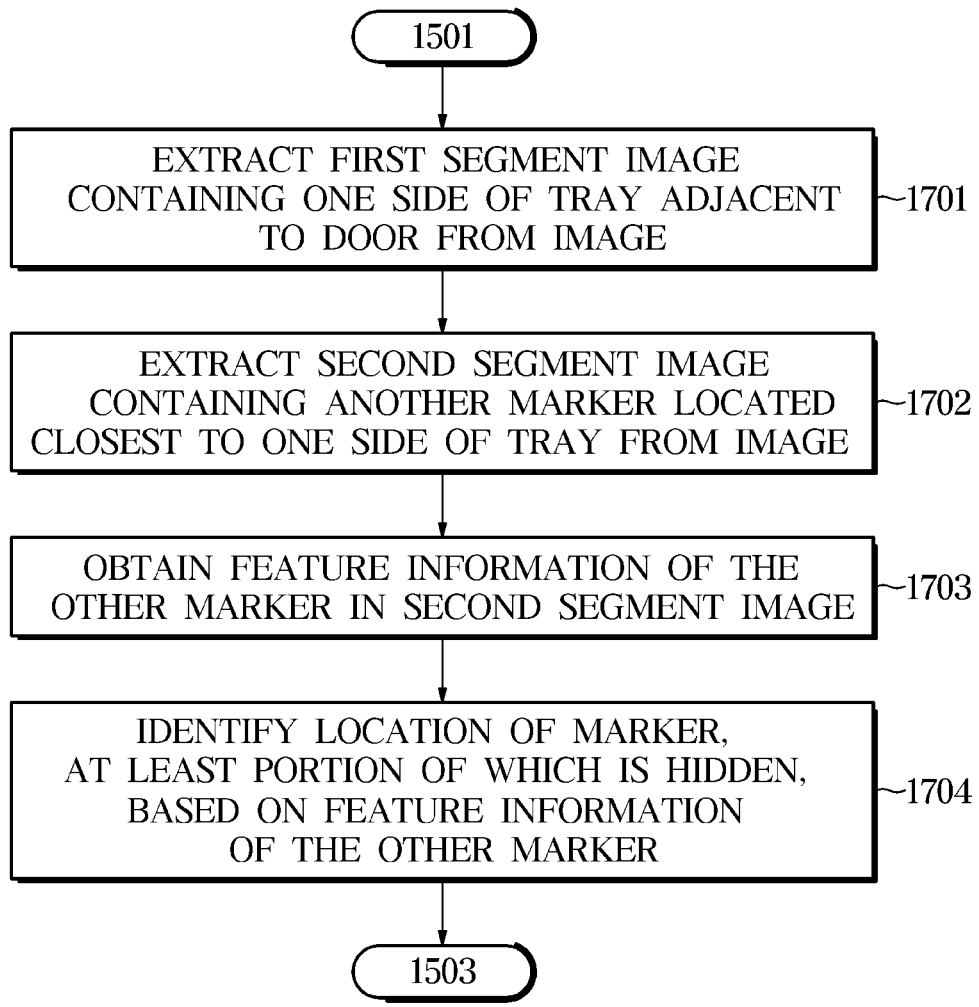
Figure 18:
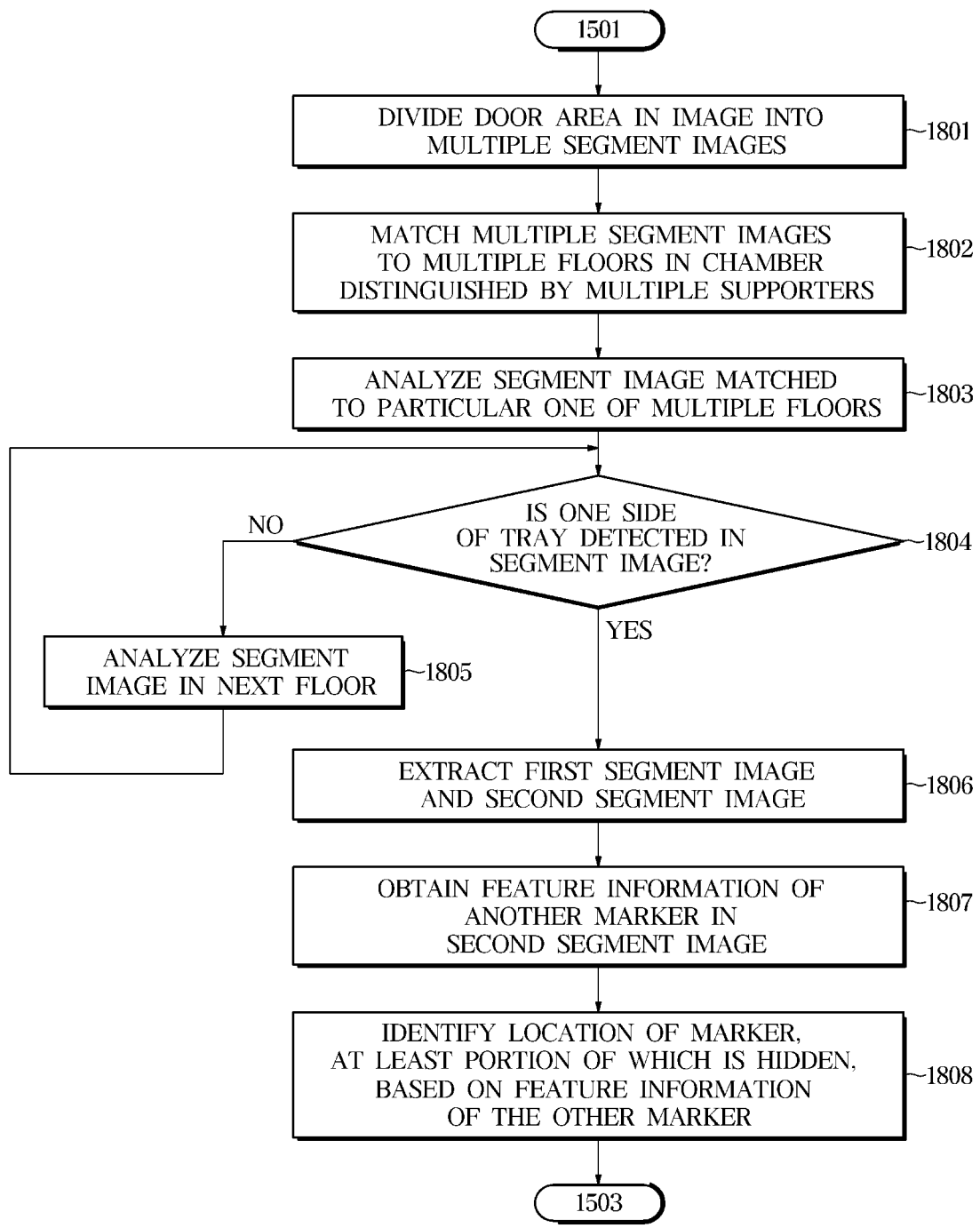

FIGS. 16, 17 and 18 are flowcharts describing various embodiments that further specify the method of controlling the cooking apparatus as described in FIG. 15.

Referring to FIG. 16, a method of estimating the height of the tray T based on depth information of an object in an image obtained by the camera 60 will be described.

The controller 200 may extract a segment image containing one side of the tray T from the image obtained by the camera 60, in 1601. The controller 200 may obtain depth information of the segment image including depth of the tray T in the image, in 1602.

The controller 200 may identify a location of a marker, at least a portion of which is hidden by the tray T, based on the depth information of the segment image, in 1603. The location of the marker, at least a portion of which is hidden by the tray T, corresponds to the height of a supporter on which the tray T is situated. The controller 200 may estimate the height of the tray T by identifying the location of the marker, at least a portion of which is hidden by the tray T, in 1503. The memory 220 may store height information of the supporters 51 and 52 and location information of the markers M1, M2 and M3 corresponding to the height information of the supporters 51 and 52. The controller 200 may identify a marker and a supporter matched to the depth of the tray T based on the height information of the supporters 51 and 52 and the location information of the markers M1, M2 and M3. The marker matched to the depth of the tray T may correspond to the marker, at least a portion of which is hidden by the tray T.

As described above, the method of estimating the height of the tray T based on the depth information of a segment image may be useful in a case that no marker is detected from an image.

Referring to FIG. 17, a method of estimating the height of the tray T based on feature information of a marker detected from the image IM will be described.

The controller 200 may extract the first segment image that contains one side of the tray T adjacent to the door 20 from the image IM of the interior of the chamber 50 obtained by the camera 60, in 1701. The controller 200 may extract the second segment image S2 that contains another marker located closest to the one side of the tray T from the image IM, in 1702. The controller 200 may obtain feature information of the other marker from the second segment image, in 1703. The feature information of the other marker may include at least one of a shape, color, a letter and a symbol. Based on the feature information including at least one of the shape, color, letter and symbol, the plurality of markers M1, M2 and M3 may be identified from one another. The controller 200 may identify a location of a marker, at least a portion of which is hidden by the tray T, based on the feature information of the other marker, in 1704.

The marker, at least a portion of which is hidden by the tray T, is located right under the other marker, so a location of the marker, at least a portion of which is hidden, may be estimated by identifying the other marker closest to the one side of the tray T. The memory 220 stores information about locations of the plurality of markers M1, M2 and M3 correlated with height information of the plurality of supporters 51 and 52. The controller 200 may obtain height of a supporter corresponding to the location of a marker, at least a portion of which is hidden by the tray T, based on height information of the supporters and location information of the markers. The controller 200 may estimate the height of the tray T to be the height of a supporter corresponding to the location of the marker, at least a portion of which is hidden, in 1503.

Referring to FIG. 18, an example of a method of processing a segment image will be described.

The controller 200 of the cooking apparatus 1 may divide a door area in an image obtained by the camera 60 into a plurality of segment images, in 1801. The controller 200 may match each of the plurality of segment images to one of the plurality of floors F1, F2 and F3 in the chamber 50 that are distinguished by the plurality of supporters 51 and 52, in 1802.

The controller 200 may first analyze a segment image matched to a certain one of the plurality of floors F1, F2 and F3, in 1803. For example, the controller 200 may sequentially analyze the plurality of segment images matched to the plurality of floors F1, F2 and F3 from top to bottom floors. In another example, the controller 200 may determine a segment image to be analyzed first based on history information relating to the height of the tray T stored in the memory 220. The controller 200 may first analyze the segment image corresponding to the height of the tray T recorded lastly or the height of the tray T recorded the most in the history information among the plurality of segment images. The time taken to estimate the tray height may be shortened by analyzing a segment image corresponding to a particular floor based on the history information. That is, speed of estimation of the tray height may become faster.

When a side of the tray T is not detected from the segment image of the particular floor, the controller 200 may analyze a segment image matched to the next floor, in 1804 and 1805. The next floor may refer to a floor under the particular floor. On the other hand, when a side of the tray T is detected from the segment image matched to the particular floor, the segment image containing the side of the tray T may be extracted as the first segment image. Furthermore, the controller 200 may extract a segment image that contains another marker located closest to the one side of the tray T as the second segment image, in 1804 and 1806.

The controller 200 may obtain feature information of the other marker from the second segment image, in 1807. The controller 200 may identify a location of a marker, at least a portion of which is hidden by the tray T, based on the feature information of the other marker, in 1808. The controller 200 may estimate the height of the tray T to be the height of a supporter corresponding to the location of the marker, at least a portion of which is hidden, in 1503.

FIG. 19 is a flowchart describing a method of controlling a cooking apparatus, according to another embodiment.

FIG. 19 is related to FIGS. 13 and 14. Referring to FIG. 19, the controller 200 of the cooking apparatus 1 may control the camera 60 to obtain an image of the interior of the chamber 50, in 1901. The controller 200 may estimate the height of the tray T further based on whether at least one of the first groove g1 of the first supporter 51, the second groove g2 of the second supporter 52 and the third groove g3 of the third supporter 53 is detected from the image of the interior of the chamber 50.

When any groove g1, g2 or g3 of the supporter 51, 52 or 53 is not detected from the image of the interior of the chamber 50, the controller 200 may estimate that the tray T is located on the top floor in the chamber 50, in 1902 and 1903. In other words, when any groove g1, g2 or g3 of the supporter 51, 52 or 53 is not detected from the image, the tray T may be estimated as being situated on the third supporter and the height of the tray T may be estimated as being the height of the third supporter 53.

When at least one of the first groove g1 of the first supporter 51, the second groove g2 of the second supporter 52 and the third groove g3 of the third supporter 53 is detected from the image of the interior of the chamber 50, the controller 200 may estimate the height of the tray T based on the location of the detected groove of the supporter, in 1904. The controller 200 may determine a cooking parameter based on the estimated height of the tray T, in 1905. The controller 200 may control the heater 80 and the fan 90 with the determined cooking parameter to perform cooking, in 1906. Furthermore, when the estimation of the nature of the object to be cooked is performed, the controller 200 may determine a cooking parameter by taking both the nature of the object to be cooked and the height of the tray T into account.

According to an embodiment, the cooking apparatus 1 includes the chamber 50; the door 20 opening or closing the chamber; the plurality of supporters 51 and 52 arranged on both side walls of the chamber at different heights to support a tray; a plurality of markers formed on the door; a camera 60 configured to obtain an image of an interior of the chamber 50; and a controller configured to identify a location of a marker, at least a portion of which is hidden by the tray in the image, estimate height of the tray in the chamber based on the location of the marker, at least the portion of which is hidden, and determine a cooking parameter to cook an object to be cooked based on the height of the tray.

The controller may extract a segment image which contains one side of the tray adjacent to the door from the image, and identify a location of a marker, at least a portion of which is hidden, based on depth information of the segment image.

The controller may detect the one side of the tray adjacent to the door in the image, detect another marker located closest to the one side of the tray in the image, and identify a location of a marker, at least a portion of which is hidden, based on feature information of the ether marker.

The controller may divide a door area in the image into a plurality of segment images, extract a first segment image containing the one side of the tray and a second segment image containing the other marker by sequentially analyzing the plurality of segment images, and obtain feature information of the other marker from the second segment image.

The controller may match the plurality of segment images to a plurality of floors in the chamber distinguished by the plurality of supporters, and extract the first segment image and the second segment image by sequentially analyzing the plurality of segment images matched to the plurality of floors from top to bottom floors.

The cooking apparatus may further include a memory configured to store history information relating to height of the tray, and the controller may detect a segment image corresponding to height of the tray recorded lastly or height of the tray recorded the most in the history information among the plurality of segment images, and analyze the detected segment image for the first time.

The cooking apparatus may further include a display, and the controller may control the display to display height information of the tray.

The controller may estimate a nature of the object to be cooked arranged on the tray from the image, and determine a cooking parameter based on the nature of the object to be cooked and the height of the tray.

The door may include a first transparent glass plate forming an outer surface of the door and a second transparent glass plate forming an inner surface of the door, and the plurality of markers may be formed on a surface of the first transparent glass plate or a surface of the second transparent glass plate.

The plurality of supporters may include a first supporter arranged at first height from a bottom of the chamber; and a second supporter arranged at second height higher than the first height.

The plurality of markers may include a lower marker formed in a first location on the door, which is close to the bottom of the chamber; a middle marker formed in a second location on the door corresponding to the first height of the first supporter; and an upper marker formed in a third location on the door corresponding to the second height of the second supporter.

Each of the plurality of markers M1, M2 and M3 may be formed to have feature information including at least one of a shape, color, a letter and a symbol.

The first supporter may include a first protrusion and a second protrusion protruding from both side walls of the chamber and separated from each other, and a first groove positioned between the first protrusion and the second protrusion. The second supporter may include a third protrusion and a fourth protrusion protruding from both side walls of the chamber and separated from each other, and a second groove positioned between the third protrusion and the fourth protrusion. The first groove and the second groove may be positioned in different vertical lines on the side wall of the chamber.

The controller may estimate height of the tray further based on whether at least one of the first groove and the second groove is detected from the image of the interior of the chamber.

According to an embodiment, a method of controlling a cooking apparatus including a door, a plurality of supporters arranged on both side walls of a chamber at different heights to support a tray and a plurality of markers formed on the door includes obtaining an image of an interior of the chamber; identifying a location of a marker, at least a portion of which is hidden by the tray in the image; estimating height of the tray in the chamber based on the location of the marker, at least the portion of which is hidden; and determining a cooking parameter for cooking an object to be cooked based on the height of the tray.

The identifying of the location of the marker, at least a portion of which is hidden, may include extracting a segment image which contains one side of the tray adjacent to the door from the image; and identifying a location of a marker, at least a portion of which is hidden, based on depth information of the segment image.

The identifying of the location of the marker, at least a portion of which is hidden, may include detecting the one side of the tray adjacent to the door in the image; detecting another marker located closest to the one side of the tray in the image; and identifying the location of the marker, at least a portion of which is hidden, based on feature information of the other marker.

The identifying of the location of the marker, at least a portion of which is hidden, may include dividing a door area in the image into a plurality of segment images; extracting a first segment image containing the one side of the tray and a second segment image containing the other marker by sequentially analyzing the plurality of segment images; and obtaining feature information of the other marker from the second segment image.

The identifying of the location of the marker, at least a portion of which is hidden, may include matching the plurality of segment images to a plurality of floors in the chamber distinguished by the plurality of supporters, and extract the first segment image and the second segment image by sequentially analyzing the plurality of segment images matched to the plurality of floors from top to bottom floors.

The identifying of the location of the marker may include obtaining history information relating to height of the tray stored in a memory; detecting a segment image corresponding to height of the tray recorded lastly or height of the tray recorded the most in the history information among the plurality of segment images; and analyzing the detected segment image for the first time.

The method may further include estimating a nature of the object to be cooked placed on the tray from the image. The cooking parameter may be determined based on the nature of the object to be cooked and the height of the tray.

As described above, according to the disclosure, a cooking apparatus and method for controlling the cooking apparatus may accurately and easily estimate height of a tray or rack positioned in a chamber by using at least one of a plurality of markers formed on the door or grooves formed in a plurality of supporters.

Furthermore, the cooking apparatus and method for controlling the cooking apparatus may determine a cooking parameter for cooking an object to be cooked based on the height of the tray or rack positioned in the chamber. Accordingly, cooking performance may be improved.

Meanwhile, the embodiments of the disclosure may be implemented in the form of a storage medium for storing instructions to be carried out by a computer. The instructions may be stored in the form of program codes, and when executed by a processor, may generate program modules to perform operation in the embodiments of the disclosure.

The machine-readable storage medium may be provided in the form of a non-transitory storage medium. The term 'non-transitory storage medium' may mean a tangible device without including a signal, e.g., electromagnetic waves, and may not distinguish between storing data in the storage medium semi-permanently and temporarily. For example, the non-transitory storage medium may include a buffer that temporarily stores data.

In an embodiment of the disclosure, the aforementioned method according to the various embodiments of the disclosure may be provided in a computer program product. The computer program product may be a commercial product that may be traded between a seller and a buyer. The computer program product may be distributed in the form of a storage medium (e.g., a compact disc read only memory (CD-ROM)), through an application store (e.g., Play Store™), directly between two user devices (e.g., smart phones), or online (e.g., downloaded or uploaded). In the case of online distribution, at least part of the computer program product (e.g., a downloadable app) may be at least temporarily stored or arbitrarily created in a storage medium that may be readable to a device such as a server of the manufacturer, a server of the application store, or a relay server.

The embodiments of the disclosure have thus far been described with reference to accompanying drawings. It will be obvious to those of ordinary skill in the art that the disclosure may be practiced in other forms than the embodiments of the disclosure as described above without changing the technical idea or essential features of the disclosure. The above embodiments of the disclosure are only by way of example, and should not be construed in a limited sense.

What is claimed is:

1. A cooking apparatus comprising:
    a chamber;
    a door configured to open or close the chamber;
    a plurality of supporters inside the chamber at different heights from each other, each supporter of the plurality of supporters configured to support a tray inside the chamber;
    a plurality of markers at different locations on the door;
    a camera configured to obtain an image of an interior of the chamber; and
    a controller configured to:
        identify the location of a marker, at least a portion of which is hidden by the tray, of the plurality of markers, in an image of the interior of the chamber obtained by the camera while the tray is being supported inside the chamber by at least one supporter of the plurality of supporters,
        estimate height of the tray in the chamber based on the identified location, and
        determine a cooking parameter for cooking an object to be cooked in the chamber based on the estimated height.

2. The cooking apparatus of claim 1, wherein, to identify the location of the marker, at least a portion of which is hidden by the tray, the controller is configured to:
    extract a segment image which contains a side of the tray adjacent to the door from the image obtained by the camera while the tray is being supported inside the chamber by the at least one supporter of the plurality of supporters, and
    identify the location of the marker, at least a portion of which is hidden, based on depth information of the extracted segment image.

3. The cooking apparatus of claim 1, wherein, to identify the location of the marker, at least a portion of which is hidden by the tray, the controller is configured to:
    detect a side of the tray adjacent to the door in the image obtained by the camera while the tray is being supported inside the chamber by the at least one supporter of the plurality of supporters,
    detect another marker of the plurality of markers located closest to the detected side of the tray in the image obtained by the camera while the tray is being supported inside the chamber by the at least one supporter of the plurality of supporters, and identify the location of the marker, at least a portion of which is hidden, based on feature information of the detected another marker.

4. The cooking apparatus of claim 3, wherein,
to detect the side of the tray and to detect the another marker, the controller is configured to:
divide a door area in the image obtained by the camera while the tray is being supported inside the chamber by the at least one supporter of the plurality of supporters into a plurality of segment images, and
extract a first segment image containing the side of the tray and a second segment image containing the another marker by sequentially analyzing the plurality of segment images, and
the controller is configured to obtain the feature information of the another marker from the second segment image.

5. The cooking apparatus of claim 4, wherein, to extract the first segment image and the second segment image, the controller is configured to:
match the plurality of segment images to a plurality of floors in the chamber distinguished by the plurality of supporters, and
extract the first segment image and the second segment image by sequentially analyzing the plurality of segment images matched to the plurality of floors from a top floor to a bottom floor.

6. The cooking apparatus of claim 4, further comprising:
a memory configured to store history information relating to height of the tray,
wherein the controller s configured to:
detect a segment image of the plurality of segment images corresponding to height of the tray recorded lastly or height of the tray recorded the most in the history information, and
analyze the detected segment image for a first time.

7. The cooking apparatus of claim 1, further comprising:
a display,
wherein the controller is configured to control the display to display height information indicating the estimated height of the tray.

8. The cooking apparatus of claim 1, wherein the controller is configured to:
estimate a nature of the object to be cooked in the chamber and positioned on the tray from the image obtained by the camera while the tray is being supported inside the chamber by the at least one supporter of the plurality of supporters, and
determine a cooking parameter based on the estimated nature and the estimated height.

9. The cooking apparatus of claim 1, wherein
the door includes:
a first transparent glass plate forming an outer surface of the door, and
a second transparent glass plate forming an inner surface of the door, and
the plurality of markers are on a surface of the first transparent glass plate or on a surface of the second transparent glass plate.

10. The cooking apparatus of claim 1, wherein
the plurality of supporters include:
a first supporter at first height from a bottom of the chamber, and
a second supporter at second height higher than the first height, the plurality of markers include:
a lower marker at a first location on the door,
a middle marker at a second location on the door corresponding to the first height of the first supporter, and
an upper marker at a third location on the door corresponding to the second height of the second supporter,
wherein the lower marker is closer to a bottom of the chamber than the middle marker and the upper marker.

11. The cooking apparatus of claim 1, wherein each marker of the plurality of markers has feature information including at least one of a shape, color, a letter and a symbol.

12. The cooking apparatus of claim 1, wherein
the plurality of supporters include:
a first supporter at first height from a bottom of the chamber, and
a second supporter at second height higher than the first height from the bottom of the chamber,
the first supporter includes:
a first protrusion protruding from a first side wall of the chamber,
a second protrusion separated from the first protrusion and protruding from a second side wall, opposite to the first side wall, of the chamber, and
a first groove positioned between the first protrusion and the second protrusion,
the second supporter includes:
a third protrusion protruding from the first side wall of the chamber,
a fourth protrusion separated from the third protrusion and protruding from the second side wall of the chamber, and
a second groove positioned between the third protrusion and the fourth protrusion, and
the first groove and the second groove longitudinally extend in a horizontal direction at different vertical heights.

13. The cooking apparatus of claim 12, wherein the controller is configured to estimate the height of the tray further based on whether at least one of the first groove and the second groove is detected from the image obtained by the camera while the tray is being supported inside the chamber by the at least one supporter of the plurality of supporters.

14. A method of controlling a cooking apparatus including a chamber, a door configured to open or close the chamber, a plurality of supporters inside the chamber at different heights from each other with each supporter of the plurality of supporters configured to support a tray inside the chamber, a plurality of markers formed at different locations on the door, and a camera, the method comprising:
obtaining, by the camera, an image of an interior of the chamber while the tray is being supported inside the chamber by at least one supporter of the plurality of supporters;
identifying a location of a marker, at least a portion of which is hidden by the tray, of the plurality of markers, in the obtained image;
estimating height of the tray in the chamber based on the identified location; and
determining a cooking parameter for cooking an object to be cooked in the chamber based on the estimated height.

15. The method of claim 14, wherein the identifying of the location of the marker, at least a portion of which is hidden, includes:

extracting, from the image, a segment image which contains a side of the tray adjacent to the door; and identifying the location of a marker, at least a portion of which is hidden, based on depth information of the extracted segment image.

16. The method of claim 14, wherein the identifying of the location of the marker, at least a portion of which is hidden, includes:

detecting a side of the tray adjacent to the door in the image;

detecting another marker of the plurality of markers located closest to the detected side of the tray in the image; and identifying the location of the marker, at least a portion of which is hidden, based on feature information of the another marker.

17. The method of claim 16, wherein the detecting the side of the tray and the detecting the another marker includes:

dividing a door area in the image into a plurality of segment images;

extracting a first segment image containing the side of the tray and a second segment image containing the another marker by sequentially analyzing the plurality of segment images; and obtaining the feature information of the another marker from the second segment image.

18. The method of claim 17, wherein the extracting the first segment image and the second segment image includes:

matching the plurality of segment images to a plurality of floors in the chamber distinguished by the plurality of supporters, and extracting the first segment image and the second segment image by sequentially analyzing the plurality of segment images matched to the plurality of floors from a top floor to a bottom floor.

19. The method of claim 17, further comprising:

obtaining history information relating to height of the tray stored in a memory;

detecting a segment image of the plurality of segment images corresponding to height of the tray recorded lastly or height of the tray recorded the most in the history information; and analyzing the detected segment image for a first time.

20. The method of claim 14, further comprising:

estimating a nature of the object to be cooked in the chamber placed on the tray from the image, wherein the cooking parameter is determined based on the estimated nature and the estimated height.

\* \* \* \* \*